US006214476B1

(12) United States Patent
Ikeda et al.

(10) Patent No.: US 6,214,476 B1
(45) Date of Patent: Apr. 10, 2001

(54) ADHESIVE RESIN COMPOSITIONS, LAMINATES, PRODUCTION METHOD THEREOF AND ORIENTED FILMS

(75) Inventors: Chikako Ikeda; Hiroyuki Sato, both of Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/020,537

(22) Filed: Feb. 9, 1998

(30) Foreign Application Priority Data

| Feb. 10, 1997 | (JP) | 9-026728 |
| Feb. 12, 1997 | (JP) | 9-027969 |
| Oct. 29, 1997 | (JP) | 9-297015 |
| Oct. 29, 1997 | (JP) | 9-297025 |
| Oct. 29, 1997 | (JP) | 9-297026 |
| Nov. 14, 1997 | (JP) | 9-313555 |

(51) Int. Cl.$^7$ .............................. B32B 27/32; C08L 53/00
(52) U.S. Cl. ................. 428/476.9; 428/483; 428/515; 428/516; 428/520; 524/505; 524/274
(58) Field of Search ................. 524/505, 274; 428/476.9, 483, 515, 516, 520

(56) References Cited

U.S. PATENT DOCUMENTS 4,628,072    12/1986    Shiraki et al. ................. 525/57

FOREIGN PATENT DOCUMENTS

| 0 440 189 | 8/1991 | (EP) . |
| 0 522 658 | 1/1993 | (EP) . |
| 0 664 327 | 7/1995 | (EP) . |
| 2 040 223 | 8/1980 | (GB) . |
| 2 066 270 | 7/1981 | (GB) . |
| WO 95/19393 | 7/1995 | (WO) . |
| WO 97/00922 | 1/1997 | (WO) . |

OTHER PUBLICATIONS

Patent Abstracts of Japan, vol. 7, No. 91 (C–162), Apr. 15, 1983, JP–58–019376, Feb. 4, 1983.

Patent Abstracts of Japan, vol. 7, No. 91 (C–162), Apr. 15, 1983, JP–58–019377, Feb. 4, 1983.

Patent Abstracts of Japan, vol. 9, No. 215 (M–409), Sep. 3, 1985, JP–60–076325, Apr. 30, 1985.

*Primary Examiner*—Peter D. Mulcahy
(74) *Attorney, Agent, or Firm*—Oblon, Spivak, McClelland, Maier & Neustadt, P.C.

(57) ABSTRACT

According to the present invention, there is provided an adhesive resin composition comprising 50–99% by weight of a modified hydrogenated block copolymer (a), which is obtained by hydrogenating a block copolymer of a vinyl aromatic compound and a conjugated diene compound followed by modification with an unsaturated carboxylic acid or a derivative thereof, wherein the content of the unsaturated carboxylic acid or the derivative thereof is 0.01–20% by weight, and 1–50% by weight of a tackifier (b), and a laminate and an oriented film wherein such adhesive resin composition is used for the adhesive layer. The adhesive resin composition of the present invention is useful in various fields such as film packaging of foods and pharmaceutical preparations.

14 Claims, No Drawings

ADHESIVE RESIN COMPOSITIONS, LAMINATES, PRODUCTION METHOD THEREOF AND ORIENTED FILMS

BACKGROUND OF THE INVENTION

1. Field of the Invention

The present invention relates to an adhesive resin composition for producing a laminate having improved properties including gas barrier properties (oxygen, carbon dioxide, etc.), resistance to contents (flavor and perfume retaining properties), good external appearance (surface gloss and transparency), mechanical strength, extendability, shrinkability, heat sealability, and interlayer adhesive strength, the laminate, a production method thereof and an oriented film obtained by orienting the laminate.

2. Description of the Related Art

Polyolefin (PO) type resins such as polypropylene, polyethylene, and ethylene-vinyl acetate copolymer have been widely used in a variety of fields. These PO type resins show good moldability, mechanical strength, chemical resistance and heat sealability. However, they show poor gas barrier properties and flavor maintaining properties, and sometimes they show inferior external appearance (surface gloss and transparency) depending on the molding methods and the kinds of the resins.

As a means to ameliorate such defects, lamination of PO type resins with polyamide (PA) type resins or ethylene-vinyl acetate copolymer saponified products (EVOH) which have excellent gas-barrier properties, or lamination with polyester (PES) type resins, for improving the resistance to contents or external appearance, have been proposed.

As PO type resins are nonpolar, the interlayer adhesive strengths of the laminates obtained by directly laminating them with EVOH, PA type resins and PES type resins are so low that the laminates cannot be employed in practical uses.

Accordingly, lamination methods utilizing various adhesives have been proposed.

For example, polyolefin type adhesive resins modified with unsaturated carboxylic acids and the like have been proposed for adhesion of PO type resins with polar resins such as EVOH and PA type resins.

For producing laminates of PO type resins with resins other than EVOH and PA type resins, i.e., the laminates of PO type resins with PES type resins, polycarbonate (PC) type resins, and acrylic resins or polystyrene (PS) type resins, and laminates of PS type resins with EVOH, PA type resins, and PES type resins, such lamination methods have been proposed as: a method in which a composition comprising an olefin type polymer and an alicyclic or aromatic polymer (as a tackifier) is used as an adhesive (Japanese Patent Laid-Open No. 50-116536), a lamination method in which a composition comprising ethylene-vinyl acetate copolymer (EVA) and a tackifier is used as an adhesive (Japanese Patent Laid-Open No. 53-147733, Japanese Patent Laid-Open No. 54-10384 and the like); a lamination method in which a composition comprising EVA, modified polyolefin and an aliphatic petroleum resin (as a tackifier) is used as an adhesive (Japanese Patent Laid-Open No. 53-127546); a lamination method in which a composition comprising a modified ethylene-α-olefin random copolymer of low crystallinity and a tackifier is used as an adhesive (Japanese Patent Laid-Open No. 61-241144); a lamination method in which a composition comprising a low density ethylene-α-olefin random copolymer of low crystallinity, a tackifier and a modified polyethylene is used as an adhesive (Japanese Patent Laid-Open No. 61-162539); a lamination method in which a hot-melt adhesive composition comprising a mixture of a styrene type thermoplastic elastomer, a tackifier, a low molecular weight polypropylene and a process oil is used as an adhesive (Japanese Patent Laid-Open No. 1-144483); and a lamination method in which a hot-mel type adhesive composition comprising a styrene type thermoplastic elastomer, an alicyclic adhesive, and a cyclic olefin random copolymer is used as an adhesive (Japanese Patent Laid-Open No. 3-223381).

Also recently, in order to further improve the performances of various wrapping materials, orientation of a coextruded product has been proposed to improve the strength and the gas barrier properties thereof or for applications in the field of shrink packaging. Also, the use of maleic anhydride modified polyethylene, maleic anhydride modified polypropylene, maleic anhydride modified ethylene-vinyl acetate copolymer, maleic anhydride modified ethylene-1-butene copolymer, styrene modified amorphous ethylene-propylene copolymer, and a hydrogenated product of maleic anhydride modified styrene-butadiene copolymer in an oriented laminate film has been proposed. A production method thereof (Japanese Patent Laid-Open No. 52-146487), a heat shrinkable multilayer film and a packaged body thereof (Japanese Patent Laid-Open Nos. 57-205147 and 58-8644), a heat shrinkable multilayer film and a production method thereof (Japanese Patent Laid-Open No. 59-152853), a biaxially oriented molded body of a thermoplastic polyester composition (Japanese Patent Laid-Open No. 60-76325), a production method of a biaxially oriented laminate (Japanese Patent Laid-Open No. 60-82324), a heat shrink packaging film (Japanese Patent Laid-Open No. 61-94753) and the like have also been proposed.

However, when cooled and hardened then heated again and oriented in both machine direction and cross direction at least 1.5 times or more, a coextruded body produced by any method shows an extremely lowered adhesive strength, far from the practically usable level. Additionally, though the adhesive strength may reach the practically usable level at a normal temperature, the laminate has poor moldability and in the case of hot-fill etc. shows a low adhesive strength at an elevated temperature, so they have many problems in their use at the moment.

On the other hand, PES films, silica deposited films, biaxially oriented polypropylene films, PA films, EVOH films or sheets or metal foils such as aluminium foil or copper foil have excellent resistance to gas transmission as well as excellent rigidity, thus they have been widely used mainly for packaging foods. Further, they can be laminated on metal such as copper, steel to avoid rusting. However, for practical use, it has been proposed to laminate even such unoriented, uniaxially or biaxially oriented films with PO films or polyethylene terephthalate films to prevent deterioration at a high temperature or for imparting heat sealablity, with EVOH or PA to improve resistance to gas transmission and with PC or PS and the like to improve rigidity.

Conventionally, for laminating the above-mentioned resin film, sheet or metal with the above-mentioned resin layer, either an anchor coat agent must be coated on such a resin film, sheet or metal in advance and the resin layer laminated thereon by an extrusion laminating method; or the resin film, sheet or the metal and the resin layer must be bonded together using a dry laminate adhesive. With such methods, an anchor coat agent or an adhesive is necessary in either case, thus it has been difficult to simplify the lamination process.

Further, a method has been proposed in which a resin film, sheet or a metal and a resin layer are subjected to coextrusion lamination using a low-density polyethylene as an adhesive resin layer, however, with such a process, it has not been possible to obtain sufficient interlayer adhesive strength.

Also, using a polyolefin resin, wherein polar groups are introduced, as an adhesive resin layer (see for example, Japanese Patent Publication No. 60-28658) has been studied, but use of the polyolefin resin, wherein polar groups are introduced, as the adhesive resin layer cannot eliminate the problem since preheating or after heating of the adherend for the coextrusion lamination is still required.

In consideration of the above-mentioned situation, an object of the present invention is to provide an adhesive resin composition having excellent adhesive strength with EVOH, PA type resins, PO type resins, PS type resins, PES type resins, acrylic resins, and PC type resins (even following orientation treatment), and excellent extrudability in the form of a film, sheet, extrusion-blowing and the like, a laminate obtained therefrom, and an oriented film of the laminate.

Another object of the present invention is to provide a laminate having enough interlayer adhesive strength which is obtained by coextrusion lamination of a resin film, sheet or a metal and a resin layer without carrying out preheating or after-heating of the adherend, and a production method thereof.

SUMMARY OF THE INVENTION

As a result of extensive study, the present inventors found that the objects can be attained by the following means and achieved the present invention.

In one aspect of the present invention, an adhesive resin composition comprising 50–99% by weight of a modified hydrogenated block copolymer (a), which is obtained by hydrogenating a block copolymer of a vinyl aromatic compound and a conjugated diene compound followed by modification with an unsaturated carboxylic acid or a derivative thereof, wherein the content of the unsaturated carboxylic acid or the derivative thereof is 0.01–20% by weight, and 1–50% by weight of a tackifier (b) is provided.

In another aspect of the present invention, the above-mentioned adhesive resin composition with which an ethylenic polymer (c) having a melt flow rate of 0.05–50 g/10 minutes and a density of 0.850–0.950 g/cm$^3$ is blended in an amount of 10–1000 parts by weight for 100 parts by weight of the total of the modified hydrogenated block copolymer (a) and the tackifier (b) is provided.

In a further aspect of the present invention, an adhesive resin composition comprising a modified hydrogenated block copolymer (a) in an amount of not less than 1% by weight and less than 50% by weight, which is obtained by hydrogenating a block copolymer of a vinyl aromatic compound and a conjugated diene compound followed by modification with an unsaturated carboxylic acid or a derivative thereof, wherein the content of the unsaturated carboxylic acid or the derivative thereof is 0.01–20% by weight, a tackifier (b) in an amount of more than 50% by weight and not more than 99% by weight, and an ethylenic polymer (c) having a melt flow rate of 0.05–50 g/10 minutes and a density of 0.850–0.950 g/cm$^3$ in an amount of 10–1000 parts by weight for 100 parts by weight of the total of the modified hydrogenated block copolymer (a) and the tackifier (b) is provided.

In a yet further aspect of the present invention, a laminate comprising a thermoplastic resin layer (layer B) comprising a thermoplastic resin which is selected from the group consisting of ethylene-vinyl acetate copolymer saponified products having an ethylene content of 15–65 mol %, and a saponification degree of not less than 90%, polyamide type resins, polyolefin type resins, styrene type resins, polyester type resins, acrylic resins and polycarbonate type resins, and an adhesive resin layer (layer A) comprising the above-mentioned adhesive resin composition is provided.

In a still further aspect of the present invention, an oriented film obtained by stretching the laminate in one axial direction or two axial directions by 1.5 times or more in terms of area ratio is provided.

In a still further aspect of the present invention, a method of producing a laminate in which an adhesive layer (layer A) comprise 50–99% by weight of a modified hydrogenated block copolymer (a), which is obtained by hydrogenating a block copolymer of a vinyl aromatic compound and a conjugated diene compound followed by modification with an unsaturated carboxylic acid or a derivative thereof, wherein the content of the unsaturated carboxylic acid or the derivative thereof is 0.01–20% by weight, and 1–50% by weight of a tackifier (b), and a thermoplastic resin layer (layer B) comprising a thermoplastic resins which is selected from the group consisting of ethylene-vinyl acetate copolymer saponified products having an ethylene content of 15–65 mol %, and a saponification degree of not less than 90%, polyamide type resins, polyolefin type resins, styrene type resins, polyester type resins, acrylic resins and polycarbonate type resins, are laminated on a resin film, sheet or a metal by coextrusion laminating method is provided.

In a still further aspect of the present invention, the above-mentioned production method in which the adhesive layer (layer A) comprises a blend containing an ethylenic polymer (c) having a melt flow rate of 0.05–50 g/10 minutes, and a density of 0.850–0.950 g/cm$^3$ in an amount of 10–1000 parts by weight for 100 parts by weight of the total of the modified hydrogenated block copolymer (a) and the tackifier (b) is provided.

In a still further aspect of the present invention, the above-mentioned production method wherein the adhesive layer (layer A) comprises a modified hydrogenated block copolymer (a) in an amount of not less than 1% by weight and less than 50% by weight, which is obtained by hydrogenating a block copolymer of a vinyl aromatic compound and a conjugated diene compound followed by modification with an unsaturated carboxylic acid or a derivative thereof, wherein the content of the unsaturated carboxylic acid or the derivative thereof is 0.01–20% by weight, a tackifier (b) in an amount of more than 50% by weight and not more than 99% by weight, and an ethylenic polymer (c) having a melt flow rate of 0.05–50 g/10 minutes and a density of 0.850–0.950 g/cm$^3$ in an amount of 10–1000 parts by weight for 100 parts by weight of the total of the modified hydrogenated block copolymer (a) and the tackifier (b) is provided.

DETAILED DESCRIPTION OF THE INVENTION (1) Modified Hydrogenated Block Copolymer (a)

The modified hydrogenated block copolymer (a) used according to the present invention is a hydrogenated block copolymer obtained by hydrogenating a block copolymer of a vinyl aromatic compound and a conjugated diene compound, followed by modification with an unsaturated carboxylic acid or a derivative thereof, optionally further diluted with an unmodified hydrogenated block copolymer, wherein the content of the unsaturated carboxylic acid or the derivative thereof is 0.01–20% by weight. A more preferable content of the unsaturated. carboxylic acid or the derivative thereof is 0.05–15% by weight, and a particularly preferable content is 0.1–7% by weight. The block copolymer is a block copolymer represented by a general formula of A—B, A—B—A, B—A—B—A, A—B—A—B—A and the like, wherein block A is a vinyl aromatic compound and block B is a conjugated diene compound; the main component of the polymer block A is an vinyl aromatic compound and examples thereof include one or more compounds selected from styrene, α-methylstyrene and vinyltoluene, with styrene particularly preferable.

One or more compounds are selected from, for example, butadiene, isoprene, 1,3-pentadiene and the like, as a conjugated diene compound constituting the polymer block B, and butadiene, isoprene and a combination thereof are particularly preferable.

The content of polymer block A whose main component is the vinyl aromatic compound is preferably 10–80% by weight, more preferably 10–70% by weight. When this polymer block content is too low or too high, sufficient adhesive strength cannot be obtained.

The hydrogenation ratio of the polymer block whose main component is the conjugated diene compound is generally not less than 50%, preferably not less than 80%, more preferably not less than 90%, and particularly preferably not less than 95%; the higher the ratio more preferable because the heat stability is improved.

The number average molecular weight of the hydrogenated block copolymer is preferably around 10,000–400,000, more preferably 20,000–300,000. A molecular weight that is either too high or too low tends to decrease the adhesive strength, and a number average molecular weight that is too high tends to lower the processability of the composition.

When the number average molecular weight of the hydrogenated block copolymer is not more than 400,000, and it is not too low, adding a fluidity improving agent which is selected from process oils, liquid polybutadiene, and olefinic waxes having a number average molecular weight of not more than 6,000 to the hydrogenated block copolymer in an amount of around 1–40% by weight, so that the lowering of the adhesive strength and the processability can be controlled is an advantageous measure. The hydrogenated block copolymer according to the present invention preferably contains a block copolymer of A—B—A structure and commercially available concrete examples thereof include "Tuftec" H type (Asahi Chemical Industry Co., Ltd.), "Kraton" G1600 type (Shell Chemical Co., Ltd.) and "Septon" 8000 type (Kuraray Co., Ltd) as a hydrogenated stvrene-butadiene type block copolymer, and "Septon" 2000, 4000 type (Kuraray Co., Ltd.) and the like as a hydrogenated styrene-isoprene type block copolymer. Examples of a hydrogenated styrene-isoprene type block copolymer having A-B structure include "Septon" 1000 type (Kuraray Co., Ltd.) and "Kraton" G1700 type (Shell Chemical CO., Ltd.) and the like.

The above-mentioned hydrogenated block copolymers can be used in an admixture of two or more kinds.

Next, the modified hydrogenated block copolymer (a) according to the present invention is obtained by graft polymerization of the above-mentioned hydrogenated block copolymer with an unsaturated carboxylic acid or a derivative thereof.

In order to produce a modified substance by graft polymerization, various conventionally known methods can be employed. In one method, for example, a hydrogenated block copolymer similar to those mentioned above, a graft monomer and a free radical generator can be previously mixed and melted with an extruder to carry out graft copolymerization, and in another method, a hydrogenated block copolymer can be dissolved in a solvent then a free radical generator and a graft monomer are added thereto to carry out graft copolymerization.

It is preferable that the graft reaction temperature is 80–300° C.

Generally, it is preferable that the free radical generator is used in an amount of 0.001–8 parts by weight per 100 parts by weight of the hydrogenated block copolymer.

As the free radical generator, organic peroxides are generally used, and preferable examples thereof include 2,5-dimethylhexane-2,5-dihydroperoxide, 2,5-dimethyl-2,5-di(t-butylperoxy)-3-hexene, di-t-butyl peroxide, t-butyl, 2,5-dimethyl-2,5-di(t-butylperoxy)hexane, dicumyl peroxide, t-butyl peroxybenzoate, t-butyl peroxy acetate, t-butyl peroxy isopropyl carbonate, benzoyl peroxide, m-toluoyl peroxide and the like.

As the unsaturated carboxylic acids and derivatives thereof, unsaturated carboxylic acids such as acrylic acid, maleic acid, fumaric acid, itaconic acid, and citraconic acid, or derivatives thereof such as anhydrides, amides, imides and esters are used alone or in admixture of two or more kinds. Among these, unsaturated dicarboxylic acids or acid anhydrides thereof are preferably used, maleic acid and an anhydride thereof are particularly preferable.

The amount thereof grafted (measured by infrared spectrophotometer) is preferably 0.01–20% by weight. An amount of the graft that is too small results in a poor adhesive property, while an amount of the graft that is too large results in inferior moldability because partial crosslinking occurs during the graft copolymerization and the product's external appearance becomes deteriorated due to fish eyes and blobbings, and the adhesive property is deteriorated as well.

The modified hydrogenated block copolymer (a) may contain unreacted graft monomers depending on the modification methods, however, from the stand-point of the adhesive property or hygiene it is preferable that as little as possible of the monomers are left as it is used as adhesive for food packaging. Accordingly, if necessary, it is preferable to carry out various removal methods including after treatments such as extraction with a good solvent such as acetone, degassing unreacted graft monomers by heating and drying treatment and the like.

(2) Tackifier (b)

The tackifier (b) used according to the present invention is an amorphous resin which is solid at a normal temperature and particularly preferable examples thereof include petroleum resins, rosin type resins, terpene type resins or hydrogenated products thereof, and appropriate substances can be selected from commercially available products.

Examples of the petroleum resins include aliphatic petroleum resins, aromatic petroleum resins or copolymers thereof, and hydrogenated products thereof, and the concrete examples thereof include commercially available products such as Toho High Resin (Toho Petroleum Resin Co., Ltd.), Picopale (Pico Co., Ltd.), Arcon P and M (Arakawa Chemical Industry Co., Ltd.), Adomerp (Idemitsu Petrochemical Co., Ltd.), Super Star Tack (Reich Hold Co., Ltd.), Escolets (Esso Kagaku K.K.), Toho Petro Resin (Tonen Petroleum Resin Co., Ltd.), High Lets (Mitsui Petrochemical Industries Ltd.), and Quinton (Nippon Zeon Co., Ltd.).

Examples of the rosin type resins include natural rosin, polymeric rosin, and derivatives thereof such as pentaerythritol ester rosin, glycerin ester rosin and hydrogenated products thereof; concrete examples thereof include commercially available products such as gum rosin, wood rosin, ester gum A, Percene A, Percene C (Arakawa Chemical Industry Co., Ltd.), Pentarin A, Pentarin C, Foral 105 (Rika Hercules Co., Ltd.).

Examples of the terpene type resins include polyterpene type resins, terpene phenol type resins and the hydrogenated products thereof and concrete examples include commercially available products such as Picolight S and A (Pico Co., Ltd.), YS resin, Clearon (Yasuhara Fats & Oils Co., Ltd.).

According to the present invention, these tackifiers can be used depending on the use, however, among these tackifiers, those having a softening point (determined by ring and ball method) of 70–150° C. are preferable, and those having a softening point of 90–150° C. are particularly preferable. When the softening point is too low, the resulting adhesive strength becomes inferior and melt kneading with a hydrogenated block copolymer or an ethylenic polymer becomes difficult. Furthermore, in order to attain an adhesive resin composition whose hue is as close to natural colour (white or colorless and transparent, with yellowing prevented) as possible, an aliphatic petroleum resin, an aromatic petroleum resin or a copolymer thereof are preferable and in particular, the hydrogenated products thereof are preferable. The hydrogenation ratio thereof is preferably not less than 80%, more preferably not less than 90%.

(3) Ethylenic Polymer (c)

The ethylenic polymer (c) used according to the present invention is an ethylene homopolymer or ethylene-α-olefin copolymer having a melt flow rate of 0.05–50 g/10 minutes, and a density of 0.850–0.950 g/cm$^3$. The α-olefin constituting the ethylene-α-olefin copolymer is an α-olefin which has normally 3–20 carbon atoms and does not contain a cyclic molecule, such as propylene, 1-butene, 1-hexene, 4-methyl-1-pentene, 1-octene, 1-decene, 1-tetradecene, and 1-octadecene, and is used alone or in an admixture of two or more kinds. Vinyl esters (such as vinyl acetate), unsaturated carboxylic acids and esters thereof (such as acrylic acid, methacrylic acid, methyl acrylate, methyl methacrylate, and ethyl acrylate) can be used as well. The ethylenic polymer (c) can be used in admixture of two or more kinds.

Concrete examples thereof include, low-density polyethylene (LDPE), high-density polyethylene (HDPE), medium density polyethylene (MDPE), linear low density polyethylene (LLDPE), very low density polyethylene (VLDPE), ethylene-butene-1 random copolymer of low crystallinity (EBM), ethylene-propylene copolymer, ethylene-vinyl acetate copolymer, ethylene-acrylic acid copolymer, ethylene-acrylic ester copolymer and the like, among these, polyolefins such as LDPE, LLDPE and VLDPE are preferable. Said polyolefins can be prepared using a catalyst such as Tiegler type catalys comprising Titanium (Ti) compound, Phillips type catalyst comprising Chromium (Cr) compound or Metallocene type catalyst comprising Zirconium (Zr), Titanium (Ti) or Hafnium (Hf) compound.

The melt flow rate (MFR) used herein is a value measured according to JIS K7210 under the conditions of temperature of 190° C., a load of 2.16 kg, and 10 minutes.

(4) Compounding Ratio of Adhesive Resin Compositions

The compounding ratio of above-mentioned components is such that the modified hydrogenated block copolymer (a) is: 50–99% by weight, preferably 50–98% by weight, particularly preferably 50–95% by weight, and the tackifier (b) is: 1–50% by weight, preferably 2–50% by weight, and particularly preferably 5–50% by weight. The ethylenic polymer (c) can be compounded in an amount of 10–1000 parts by weight, preferably 13–950 parts by weight, particularly preferably 15–900 parts by weight per 100 parts by weight of the total of component (a) and component (b).

The tackifier (b) can be incorporated in the composition in an amount of more than 50% by weight and not more than 99% by weight by compounding the ethylenic polymer (c). In such a case, the compounding ratio of the above-mentioned components becomes such that the modified hydrogenated block copolymer (a) is: not less than 1% by weight and less than 50% by weight, preferably 1–48% by weight, particularly preferably 1–45% by weight, and the tackifier (b) is: more than 50% by weight up to 99% by weight, preferably 52–99% by weight, particularly preferably 55–99% by weight, and the ethylenic polymer (c) can be compounded in an amount of 10–1000 parts by weight, preferably 10–950 parts by weight, particularly preferably 10–900 parts by weight per 100 parts by weight of the total of the component (a) and the component (b).

When the ethylenic polymer (c) is not compounded, the tackifier (b) in an amount less than 1% by weight is not desirable since the resulting adhesion to each adherend is lowered, but the tackifier in an amount of more than 50% by weight results in high fluidity that tends to disadvantageously degrade the moldability.

By adding the ethylenic polymer (c) in an amount of not less than 10 parts by weight, the moldability and the handling can be greatly improved. However, when the ethylenic polymer (c) is added in an amount of more than 1000 parts by weight, the resulting adhesive strength tends to be extremely lowered disadvantageously.

(5) Method of Producing an Adhesive Resin Composition

The adhesive resin compositions of the present invention can be prepared by various known methods, for example, they can be prepared by mixing in a tumbler blender, twin-shell blender, ribbon blender, Henschel mixer and the like, followed by melt kneading in a single-screw extruder, twin-screw extruder, Banbury type mixer, and kneader, and granulation or grinding.

In addition to the above-mentioned components, generally used additives such as a heat stabilizer, weathering stabilizer, anti-blocking agent, slip agent, anti-static agent, flame-retardant, neutralizer for a catalyst residue, pigment, dye and inorganic/organic filler can be blended in the composition in an amount that does not damage the object of the present invention.

As the resin composition of the present invention provides excellent adhesion with various thermoplastic resin layers (layer B) which will be described later, it can be used as a laminate with the thermoplastic resin layer(layer B) and as an oriented film obtained by orientation of the laminate. It can also be used as an adhesive layer (layer A) for adhering a resin film, resin sheet or a metal with the thermoplastic resin layer (layer B).

(6) Thermoplastic Resin Layer (layer B)

According to the present invention, thermoplastic resins such as EVOH, PA type resins, PO type resins, PS type resins, PES type resins, acrylic resins and PC resins can be used for the thermoplastic resin layer (layer B) which is laminated with the adhesive layer (layer A) comprising the adhesive resin composition. Examples of the thermoplastic resin (layer B) include one or more materials selected from EVOH having an ethylene content of 15–65 mol %, a saponification degree of not less than 90%; PES type resins such as polyethylene terephthalate (PET), copolymerized PET, polybutylene terephthalate, polyethylene naphthalate, polycyclohexylene terephthalate; PA type resins such as 6-nylon, 6,6-nylon, 6-6,6-nylon, 12-nylon, polyamide resins containing xylylene group; PO type resins such as polypropylene type resins, polyethylene type resins, ethylene-vinyl acetate copolymer, ethylene-acrylic acid copolymer, ethylene-acrylic ester copolymer, 4-methyl-1-pentene resins; PS type resins such as general-use polystyrene, shock resisting polystyrene, styrene-methacrylic acid copolymer; acrylic resins such as polyacrylonitrile, polymethylmethacrylate, acrylonitrile-methylacrylate-butadiene copolymer; and polycarbonate resins (PC type resins); and a mixture of such resin and a filler such as a planar filler.

The thermoplastic resin layer (layer B) is further illustrated in the following paragraphs.

EVOH used for the thermoplastic resin layer (layer B) is an ethylene-vinyl acetate copolymer having an ethylene content of preferably 15–65 mol %, more preferably 25–50 mol %, which is saponified such that the saponification degree becomes preferably not less than 50%, more preferably not less than 90%. When the ethylene content is too low, EVOH is easily decomposed by heat, melt molding thereof becomes difficult, the stretchability thereof becomes inferior, the EVOH easily absorbs water and swells and shows low water resistance. On the other hand, when the ethylene content is too high, the resistance to gas transmission tends to be decreased. When the saponification degree is too low, the resistance to gas transmission also tends to be decreased.

Examples of PA type resins used for the thermoplastic resin layer (layer B) include polyamides obtained by polycondensation of aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis (aminomethyl)cyclohexane, bis(p-aminocyclohexylmethane), m- or p-xylylenediamine, with aliphatic, alicyclic, or aromatic dicarboxylic acids such as adipic acid, suberic acid, sebacic acid, cyclohexane dicarboxylic acid, terephthalic acid, and isophthalic acid; polyamides obtained by condensation of aminocarboxylic acids such as ε-aminocaproic acid, and 11-aminoundecane carboxylic acid; polyamides obtained from lactam such as ε-caprolactam and ω-laurolactam; or a mixture of copolymerized polyamides comprising these components. Concrete examples thereof include nylon 6, nylon 66, nylon 610, nylon 9, nylon 11, nylon 12, nylon 6/66, nylon 66/610, nylon 6/11 and the like. Among these, nylon 6 and nylon 66 are preferable due to their excellent melting point and rigidity. The molecular weight is not particularly limited, however, usually a polyamide having a relative viscosity ηr(measured in 98% sulfuric acid according to JIS K6810) of not less than 0.5 is used, those having a relative viscosity of not less than 2.0 are particularly preferable.

PO type resins used for the thermoplastic resin layer (layer B) include crystalline polymers comprising α-olefins having 2–4 carbon atoms such as ethylene, propylene and 1-butene alone or as the main components thereof. Examples of such PO type resins include polyethylene, polypropylene and poly-1-butene but are not limited to homopolymers, and as long as the main component is the α-olefin having 2–20 carbon atoms, they can be copolymers with other α-olefins having 2–20 carbon atoms, vinyl compounds such as vinyl acetate, vinyl chloride, acrylic acid, methacrylic acid, and styrene, or they can also be graft copolymers obtained by graft modification with an unsaturated carboxylic acid or a derivative thereof such as maleic anhydride, maleic acid, and acrylic acid. These polyolefins can be a mixture as well.

Concrete examples of the above-mentioned polyethylene include, for example, high pressure low density polyethylene (LDPE), ethylene-propylene copolymer, ethylene-1-butene copolymer, ethylene-4-methyl-1-pentene copolymer, ethylene-1-hexene copolymer, high density polyethylene (HDPE), ethylene-vinyl acetate copolymer, ethylene-acrylic acid copolymer, ethylene-acrylic ester copolymer and the like. The melt flow rate of the polyethylene is not particularly limited, but it is preferably 0.01–30 g/10 minutes, more preferably 0.1–10 g/10 minutes from the stand-point of moldability.

Concrete examples of the above-mentioned polypropylene include, for example, polypropylene (propylene homopolymer) and propylene random copolymers (having a propylene content of normally not less than 90 mol %, preferably not less than 95 mol %) such as propylene-ethylene random copolymer, propylene-ethylene-1-butene random copolymer and propylene-1-butene random copolymer, propylene-ethylene block copolymer (having an ethylene content of normally 5–30 mol %) and the like. Among these, homopolymer and random copolymers are preferable due to their high transparency, and particularly the random copolymers having a melting point of 130–140° C. are preferable due to their high heat sealability. The melt flow rate of propylene is not particularly limited, but it is usually 0.5–30 g/10 minutes, preferably 0.5–10 g/10 minutes from the stand-point of moldability.

Concrete examples of the above-mentioned poly-1-butene include, for example, 1-butene homopolymer, 1-butene-ethylene copolymer, 1-butene-propylene copolymer, and 1-butene-4-methyl-1-pentene copolymer. Here, the melt flow rate of the poly-1-butene is not particularly limited, however, it is normally 0.01–100 g/10 minutes and preferably 0.03–30 g/10 minutes from the view point of the moldability.

PS type resins used for the thermoplastic resin layer (layer B) are a styrene base resins such as styrene homopolymer, copolymers of styrene with acrylonitrile, methyl (meth) acrylate or a rubber modified product thereof, and concrete examples thereof include polystyrene, impact resistance polystyrene (rubber blended polystyrene), AS resins (SAN), and thermoplastic resins referred to as ABS, and SMA (styrene-maleic anhydride polymer). As the polystyrene, those having a melt flow rate of 0.1–50 g/10 minutes, preferably 1–20 g/10 minutes are usually used. Those having a MFR that is out of the above-mentioned range tend to have degraded moldability.

PES type resins used for the thermoplastic resin layer (layer B) comprise an acid component from aromatic dicarboxylic acids such as terephthalic acid, isophthalic acid, diphenylether-4,4-dicarboxylic acid, and naphthalene-1,4- or 2,6-dicarboxylic acid, aliphatic dicarboxylic acids such as oxalic acid, succinic acid, adipic acid, sebacic acid, and undeca dicarboxylic acid, alicyclic dicarboxylic acids such as hexahydroterephthalic acid, and a glycol component of aliphatic glycols such as ethylene glycol, propylene glycol, 1,4-butane diol, and neopentyl glycol, alicyclic glycols such as cyclohexane dimethanol, and aromatic dihydroxy compounds such as bisphenol A, and concrete examples thereof include polyethylene terephthalate (PET), copolymerized PET, polybutylene terephthalate, polyethylene naphthalate, polycyclohexene terephthalate and the like.

Among these, polyethylene terephthalate (PET) which is a thermoplastic polyester resin wherein 80 mol % or more of the dicarboxylic acid component is terephthalic acid, and 80 mol % or more of the glycol component is ethylene glycol is particularly preferable. Copolymerized PET or a mixture of PET with another polyester are also preferable.

Examples of the acrylic resins used for the thermoplastic resin layer (layer B) include methyl polyacrylate, ethyl polyacrylate, butyl polyacrylate, 2-ethyl hexyl polyacrylate, polymethyl methacrylate, polyacrylonitrile, polymethacrylonitrile, methyl methacrylate-acrylonitrile copolymer, methyl methacrylate-α-methyl styrene copolymer and the like. Further, styrene-acrylonitrile copolymer, styrene-acrylonitrile-butadiene copolymer, styrene-methyl methacrylate copolymer and the like can be used as well. Among these, polyacrylonitrile and styrene-acrylonitrile-butadiene copolymer are particularly preferable.

These acrylic resins can be appropriately selected from commercially available products, and various additives such as a plasticizer, stabilizer, inorganic filler, antistatic agent and pigment can be blended with in such an amount that does not damage the effect of the present invention.

PC resins used for the thermoplastic resin layer (layer B) are various polycarbonates obtained by reacting a dihydroxy compound with phosgene or diphenyl carbonate according to known methods. Examples of the dihydroxy compound include hydroquinone, resorcinol, 4,4'-dihydroxydiphenylmethane, 4,4'-dihydroxydiphenylethane, 4,4'-dihydroxydiphenyl-n-butane, 4,4'-dihydroxydiphenylheptane, 4,4'-dihydroxydiphenyl-2,2-propane(bisphenol A), 4,4'-dihydroxy-3,3'-dimethyldiphenyl-2,2-propane, 4,4'-dihydroxy-3,3'-diphenyldiphenyl-2,2-propane, 4,4'-dihydroxydichlorodiphenyl-2,2-propane, 4,4'-dihydroxydiphenyl-1,1-cyclopentane, 4,4'-dihydroxydiphenyl-1,1-cyclohexane, 4,4'-dihydroxydiphenylmethylphenylmethane, 4,4'-dihydroxydiphenylethyl phenyl methane, 4,4'-dihydroxydiphenyl-2,2,2-trichloro-1,1-ethane, 2,2'-dihydroxydiphenyl, 2,6-dihydroxynaphthalene, 4,4'-dihydroxydiphenylether, 4,4'-dihydroxy-3,3'-dichlorodiphenylether, and 4,4'-dihydroxy-2,5-diethoxyphenylether and the like. Among them, polycarbonate obtained using 4,4'-dihydroxy-diphenyl-2,2-propane (bisphenol A) is preferable due to excellent mechanical properties and transparency.

(7) Method of Producing a Laminate

As a method of producing a laminate of the present invention, various known methods can be used.

For example, in a coextrusion process, resins are molten in an extruder and supplied to a multi-layer die wherein they are laminated to provide an inflation film, T-die film, sheet or pipe, and in a co-injection molding process, resins are molten and injected into the same mold with time lag to carry out coextrusion lamination of an unoriented parison in the form of a test tube and the like.

According to the present invention, there is also provided a laminate comprising (i) a resin film, sheet or metal, (ii) an adhesive layer (layer A) and (iii) a thermoplastic resin layer (layer B) and a production method thereof. The (i) resin film or metal foil in this mode will now be explained. As the resin film, unoriented films or uniaxially oriented or biaxially oriented films are used, and concrete examples thereof include polyester type resin films such as polyethylene terephthalate, copolymerized PET, polybutylene terephthalate, polyethylene naphthalate, and polycyclohexylene terephthalate films, polyolefin type resin films such as polypropylene and polyethylene films, polyamide type resin films such as 6-nylon, 6,6-nylon, 6-6,6-nylon or 12-nylon, and MXD nylon films and other ethylene-vinyl acetate copolymer saponified product films, and deposited films such as SiOx deposited O-PET, K coat nylon films wherein silica, aluminium or vinylidene chloride and the like is deposited on one or both surfaces of various films, or printed films whose one or both surfaces are printed with various inks, and the like. These films are preferably oriented in at least one axial direction. Such resin films have a thickness of 5–100 μm, and show excellent resistance to gas transmission, as well as excellent mechanical strength, moisture resistance, transparency and heat resistance.

Furthermore, as the resin sheet, unoriented sheets, uniaxially or biaxially oriented sheets are used, and concrete examples thereof include polyester type resin sheets such as polyethylene terephthalate (PET), copolymerized PET, polybutylene terephthalate, polyethylene naphthalate, and polycyclohexylene terephthalate, polyolefin type resin sheets such as polypropylene and polyethylene, polyamide type resin sheets such as 6-nylon, 6,6-nylon, 6-6,6-nylon, 12-nylon and MXD nylon, K coat nylon sheets and other ethylene-vinyl acetate copolymer saponified product sheets, deposited sheets wherein silica or aluminium and the like is deposited on one or both surfaces of various sheets, and printed sheets whose one or both surfaces are printed with various inks, and the like.

The metal has a thickness of 5–150 μm, and it can be a metal foil alone or it can be backed with Kraft paper. It may be in the form of a plate or a tube. As the metal, various metals which can be molded into a foil can be used, and preferable examples thereof include aluminium, copper and iron.

For these (i) resin films, sheets or metal, conventionally used substances can be widely used. If necessary aluminium or silica can be deposited on one or both surfaces of the resin film as mentioned above.

In a method of producing such a laminate comprising (i) a resin film, sheet or metal, (ii) an adhesive layer (layer A) and (iii) a thermoplastic resin layer (layer B), a composition constituting (ii) the adhesive layer (layer A) and at least one kind of resin constituting (iii) the thermoplastic resin layer (layer B) are melted in separate extruders respectively and supplied to a die with a two layer structure or three or more layer structure separately, and are coextrusion-laminated onto (i) the resin film, sheet or metal such that (ii) the adhesive layer (layer A) is in contact with (i) the resin film, sheet or metal to produce a laminate. The die used herein is a so-called flat die and both multi manifold type and single manifold type utilizing a black box can be used. The resin films, sheets or metal can be either preheated or not. The laminate can be produced by sandwich lamination wherein an adhesive layer (layer A) is extruded between base materials comprising resin films, sheets or metal. In such an event, the base materials can be either of the same or different kind of materials.

(8) Production of an Oriented Film

Various conventionally known methods can be used for producing an oriented film of the present invention.

For example, in one such method, an unoriented (multilayer) laminate obtained in the methods described in the above-mentioned (7) is cooled and solidified, then heated again in-line or out-line at an orientation temperature of 60–160° C., and uniaxially or biaxially oriented at least 1.5 times in terms of area ratio using a tenter, plug, compressed air and the like to produce a uniaxially or biaxially oriented product in the form of a film, cup, bottle and the like.

For an inflation film, an inflation simultaneous biaxial orientation method is generally used; for a T-die film, a tenter simultaneous biaxial orientation method, and a sequential biaxial orientation method using rolls and a tenter are generally used; for a cup, air-pressure forming in a mold using only compressed air and the like, as well as SPPF molding utilizing both a plug and compressed air are generally used; for a bottle, a pipe orientation method is generally used in which a laminated pipe is drawn longitudinally, then drawn laterally in a mold using compressed air and the like, and a closed-end parison orientation method is generally used for the closed-end parison in the form of a test tube which is produced by injection molding; in the closed-end parison orientation method, the closed-end parison is longitudinally drawn in a mold using a rod, then drawn laterally using compressed air and the like.

The oriented film can be, if desired, multi-layered to have two or more layers by providing an adhesive resin composition of the present invention between the layers.

The oriented film of the present invention can be further heated after orientation, that means subjected to heat-set, if desired, to improve heat resistance (but shrinkability is somewhat lowered).

After orientation, the adhesive resin composition of the present invention has excellent adhesion with various materials in a wide range of temperatures from a normal use temperature to an elevated temperature, it can be preferably used for heat formed cups, blown bottles, injection bottles and film packaging materials having excellent heat resistance, gas barrier properties, moisture resistance, transparency and strength, used for foods, pharmaceutical products, and the like, or for a film for a laminate with an unwoven fabric or metal in the textile field as well as industrial fields.

Another advantage of the method of producing the laminate of the present invention is that a laminate having enough interlayer adhesive strength can be advantageously produced without preliminarily coating an anchor coat, and preheating or after-heating of the adherend is not required for the coextrusion lamination process, since (2) an adhesive layer (layer A) and (3) a layer of a thermoplastic resin (layer B) such as polyolefin, polyethylene terephthalate, ethylene-vinyl acetate copolymer saponified product, nylon, polycarbonate, polystyrene, and acrylic resin film are laminated on (1) a resin film, sheet or a metal using a coextrusion laminating method.

EXAMPLES

The present invention will be further illustrated by the following examples.

Laminates in the following Examples 1–10, and Comparative Examples 1–4 were produced by the following method A or method B.

1) Method A: Two-kind-three-layer Coextrusion Water-cooled Inflation Film Forming Method The layer structure from the inner layer to the outer layer was an adherend/an adhesive/an adherend. Each layer had a thickness of 100 μm.

The die width of the extruder, from the inner layer to the outer layer, was 40 mmφ/35 mmφ/40 mmφ.

The coextrusion conditions for each adherent are shown as follows.

Coextrusion Temperature
　Polyester type resins=275° C.
　Polyamide type resins=250° C.
　Ethylene-vinyl acetate copolymer saponified products=230° C.
　Acrylic resins=220° C.
　Styrene type resins=220° C.
　Polycarbonate resins=275° C.
　Polyolefin type resins=230° C.

The line speed was set at 5 m/min.

2) Method B: Three-kind-five-layer Coextrusion Sheet Forming Method

The layer structure from the inner layer to the outer layer was an adherend/an adhesive/a gas barrier resin/an adhesive/an adherend, and the thickness of each layer was 220 μm/40 μm/50 μm/40 μm/220 μm.

The die width of the extruder was 65 mmφ/45 mmφ/45 mmφ/45 mmφ/65 mmφ.

The coextrusion conditions for each adherent are shown as follows.

Coextrusion Temperature
　Polyester type resins=235° C.
　Polyamide type resins=250° C.
　Ethylene-vinyl acetate copolymer saponified products=230° C.
　Acrylic resins=220° C.
　Styrene type resins=220° C.
　Polycarbonate resins=275° C.
　Polyolefin type resins=200° C.

The line speed was set at 5 m/min.

In the following Examples 1–10 and Comparative Examples 1–4, laminates were oriented by the following method.

Tenter Method
　Standard type biaxial orientation machine: produced by T.M. Long Co., Ltd.
　Maximum orientation magnification: 7.2×7.2 times
　Orientation speed: 7.6–3000 cm/min
　Heating method: Hot Air Circulation (room temperature—350° C.)
　Orientation head driving: oil cylinder
　Thickness of a stretchable sample:0.08–2 mm
　Orientation magnification: 3.3×3.3 times The evaluation items were examined according to the following methods.

The adhesive strength of the laminate (kg/10 mm) in the following Examples 1–10 and Comparative Examples 1–4 was measured according to JIS K-6854 under the following conditions.

Peeling width: 10 mm
　Peeling conditions: T-peel
　Peeling speed: 50 mm/min
　Temperature: 23° C. and 60° C.

Boiling treatment in the following Examples 1–10 and Comparative Examples 1–4.

The laminates of the present invention produced by method A or method B were drawn by 3.3×3.3 times and the resulting films were subjected to the following treatment.

The oriented films were put in a PE bag, heat sealed then treated in hot water of 90° C. for 30 minutes, then taken out from the hot water and cooled in 23° C. water (for about 30 minutes) to obtain samples.

Example 1

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 90% by weight and a tackifier (an alicyclic petroleum resin, number average molecular weight: 860, specific gravity: 0.999, softening point: 140° C.) in an amount of 10% by weight were previously mixed in a 50 L twin-shell blender for 5 minutes, melted and kneaded in a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 2

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 20% by weight, a tackifier (an alicycLic petroleum resin, number average molecular weight: 710, specific gravity: 0.998, softening point: 115° C.) in an amount of 30% by weight and styrene-butadiene copolymer hydrogenated product (styrene ratio: 30% by weight, MFR-200° C. 5 kg: 3.5 g/10 minutes) in an amount of 50% by weight were mixed previously in a 50 L twin-shell blender for 5 minutes, melted and kneaded in a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 3

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 30% by weight, a tackifier (an alicyclic petroleum resin, number average molecular weight: 710, specific gravity: 0.998, softening point: 115° C.) in an amount of 20% by weight and ethylene-butene copolymer (density: 0.900 g/cm$^3$, melting point: 88° C., MFR-190° C. 2.16 kg: 5 g/10 minutes) in an amount of 50% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 4

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 10% by weight, a tackifier (an alicyclic petroleum resin, number average molecular weight: 860, specific gravity: 0.999, softening point: 140° C.) in an amount of 20% by weight, styrene-butadiene copolymer hydrogenated product (styrene ratio: 20% by weight, MFR-200° C. 5 kg: 0.3 g/10 minutes, hydrogenation ratio: 97%) in an amount of 35% by weight and ethylene-butene copolymer (density: 0.88 g/cm$^3$, melting point: 72° C., MFR-190° C. 2.16 kg: 4 g/10 minutes) in an amount of 35% by weight were mixed previously in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 5

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 5% by weight, a tackifier (an alicyclic petroleum resin, number average molecular weight: 700, specific gravity: 0.995, softening point: 100° C.) in an amount of 20% by weight, styrene-butadiene copolymer hydrogenated product (styrene ratio: 13% by weight, MFR-200° C. 5 kg: 8 g/10 minutes, hydrogenation ratio: 98%) in an amount of 30% by weight and a low-density polyethylene (density: 0.918 g/cm$^3$, melting point: 106° C., MFR-190° C. 2.16 kg: 14 g/10 minutes) in an amount of 45% by weight were mixed previously in a 50 L twin-shell blender for 5 minutes, and molten and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 6

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 5% by weight, a tackifier (an alicyclic petroleum resin, number average molecular weight: 700, specific gravity: 0.995, softening point: 100° C.) in an amount of 30% by weight, styrene-butadiene copolymer hydrogenated product (styrene ratio: 40% by weight, MFR-200° C. 5 kg: 0.7 g/10 minutes, hydrogenation ratio: 98%) in an amount of 30% by weight and a low-density polyethylene (density: 0.918 g/cm$^3$, melting point: 106° C., MFR-190° C. 2.16 kg: 4 g/10 minutes) in an amount of 35% by weight were mixed previously in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 7

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 20% by weight, a tackifier (β-pinene-terpene type resin, number average molecular weight: 820, softening point: 112° C.) in an amount of 10% by weight, styrene-propylene copolymer hydrogenated product (styrene ratio: 30% by weight, MFR-200° C. 5 kg: 4 g/10 minutes, hydrogenation ratio: 98%) in an amount of 30% by weight and a straight-chain low density polyethylene (density: 0.918 g/cm$^3$, melting point: 106° C., MFR-190° C. 2.16 kg: 14 g/10 minutes) in an amount of 40% by weight were mixed previously in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled then cut to produce pellets.

Comparative Example 1

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 10% by weight, styrene-butadiene copolymer hydrogenated product (styrene ratio: 20% by weight, MFR-200° C. 5 kg: 0.3 g/10 minutes) in an amount of 30% by weight, and ethylene-butene copolymer (density: 0.900 g/cm$^3$, melting point: 88° C., MFR-190° C. 2.16 kg: 5 g/10 minutes) in an amount of 70% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Comparative Example 2

Maleic anhydride graft modified styrene-butadiene copolymer hydrogenated product (grafted ratio: 2% by weight, density: 0.91 g/cm$^3$, styrene ratio: 30% by weight, hydrogenation ratio: 98%) in an amount of 40% by weight, and a tackifier (an alicyclic petroleum resin, number average molecular weight: 860, specific gravity: 0.999, softening point: 140° C.) in an amount of 60% by weight were previously mixed in a 50 L twin-shell blender for 5 minutes, and melting and kneading with a twin screw extruder PCM 30 (D=30 mmφ, L/D=32; Ikegai Corporation) at a temperature of 180° C., a screw revolving speed of 180 rpm, a feed rate of 11 kg/hour was attempted, but it was too sticky to be pelletized. The subsequent evaluation could not be carried out.

Comparative Example 3

Styrene-butadiene copolymer hydrogenated product (styrene ratio: 30% by weight, MFR-200° C. 5 kg: 10 g/10 minutes, hydrogenation ratio: 98%) in an amount of 30% by weight, a tackifier (an alicyclic petroleum resin, number average molecular weight: 710, specific gravity: 0.998, softening point: 115° C.) in an amount of 20% by weight, and a low-density polyethylene (density: 0.919 g/cm$^3$, melting point: 109° C., MFR-190° C. 2.16 kg: 14 g/10 minutes) in an amount of 50% by weight were previously mixed in a 50 L Twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Comparative Example 4

A tackifier (an alicyclic petroleum resin, number average molecular weight: 860, specific gravity: 0.999, softening point: 140° C.) in an amount of 30% by weight, and ethylene-butene copolymer (density: 0.900 g/cm$^3$, melting point: 88° C., MFR-190° C. 2.16 kg: 5 g/10 minutes) in an amount of 70% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

The pellets obtained in the above-mentioned Examples 1–7, and Comparative Examples 1–4 were used with various adherends, i.e. polyester type resin Dianite PA 500 (specific gravity: 1.34, intrinsic viscosity: 0.76 dl/g, from Mitsubishi Rayon Co., Ltd.(PET)), ethylene-vinyl acetate copolymer saponified product, Eval EP-F101 (density: 1.19 g/cm$^3$, melt index: 1.3, ethylene copolymer content: 32 mol %, from Kuraray Co., Ltd.), polyamide type resin Novatech 1020 CA2 (melting point: 224° C., from Mitsubishi Chemical Co., Ltd.), styrene type resin Denkastyrol HI-E-4 (specific gravity: 1.04, melt index: 3.5, from Denki Kagaku Kogyo K.K.), polycarbonate, Eupiron E-2000 (specific gravity: 1.2, from Mitsubishi Gas Chemical Co., Inc.), acrylic type resin, Valex 2090 (specific gravity: 1.15, melt index: 3 g/10 minutes, from Mitsui Toatsu Chemicals, Inc. (PAN)), polyolefin type resin Novatech PP FY6H (density: 0.90 g/cm$^3$, melt flow rate: 1.9 g/10 minutes, from Nippon Polychem Co., Ltd. (PP)), from Novatech HD HY340 (density: 0.953 g/cm$^3$, melt flow rate: 1.5 g/10 minutes, Nippon Polychem Co., Ltd. (HDPE)), and two-kind-three-layer films were produced therefrom with the adhesion process of method A and cooled and hardened, then the adhesive strength of the raw film was measured in an atmosphere of 23° C. and this high temperature adhesive strength thereof was measured in an atmosphere of 60° C. The adhesive strength of an oriented film was measured after the film had been oriented in an atmosphere of 70° C. in the machine direction and cross direction by 3.3×3.3 times on a tenter, and the adhesive strength of the film which, was subjected to boiling treatment (90° C., 30 minutes), was measured in an atmosphere of 23° C. The results are shown in Table 1. In Table 1, the figures in the rows for PS, PC, PAN, PP, and HDPE indicated by 23° C. are the data of raw films.

Examples 8–10

The pellets obtained in the above-mentioned Examples 4–6, were used with polyolefin type resin, LE 425 (density: 0.923 g/cm$^3$, MFR: 2 g/10 min., from Mitsubishi Chemical Co., Ltd.) as an adherend, and gas barrier resins such as polyester type resin, PET-G 6763 (specific gravity: 1.27, intrinsic viscosity: 0.75 dl/g, from Eastman Kodak Co.), polyamide type resin, Novatech 1020 CA2 (melting point: 224° C., from Mitsubishi Chemical Co., Ltd.), ethylene-vinyl acetate copolymer saponified product, Eval EP-E151B (density: 1.14 g/cm$^3$, melt index: 5.5, ethylene copolymer content: 44 mol %, from Kuraray Co., Ltd.), three-kind-five-layer films were produced in the adhesion process of method B, cooled and hardened and the adhesive strength of the raw film was measured in an atmosphere of 23° C. and high temperature adhesive strength thereof was measured in an atmosphere of 60° C. The adhesive strength of an oriented film was measured after the film had been oriented in an atmosphere of 90° C. in the machine direction and cross direction by 3.3×3.3 times on a tenter, and the adhesive strength of the film which was then subjected to boiling treatment (90° C., 30 minutes) was measured in an atmosphere of 23° C. The results are shown in Table 2.

TABLE 1

Results of evaluated adhesive strength of films obtained by method A

|  |  | Ex. 1 | Ex. 2 | Ex. 3 | Ex. 4 | Ex. 5 | Ex. 6 | Ex. 7 | CE. 1 | CE. 2 | CE. 3 | CE. 4 |
|---|---|---|---|---|---|---|---|---|---|---|---|---|
| PET | 23° C. | 3500 | 3000 | 3000 | 3300 | 3100 | 3000 | 3300 | 10 | — | 1800 | 200 |
|  | 60° C. | 150 | 150 | 400 | 400 | 500 | 700 | 200 | — | — | 100 | — |
| After orientation |  | 300 | 400 | 350 | 500 | 350 | 450 | 300 | — | — | 80 | — |
| After boiling |  | 600 | 700 | 600 | 800 | 500 | 430 | 350 | — | — | — | — |
| EVOH | 23° C. | 2500 | 2600 | 2400 | 2700 | 2500 | 2600 | 3000 | — | — | 1000 | 100 |
|  | 60° C. | 250 | 200 | 350 | 400 | 450 | 650 | 500 | — | — | 70 | — |
| After orientation |  | 350 | 300 | 350 | 300 | 200 | 400 | 430 | — | — | 50 | — |
| After boiling |  | 600 | 650 | 700 | 700 | 600 | 750 | 500 | — | — | — | — |
| PA | 23° C. | 1) | 1) | 1) | 3300 | 3000 | 2900 | 3100 | — | — | 2000 | 200 |
|  | 60° C. | 250 | 300 | 300 | 350 | 400 | 500 | 180 | — | — | 50 | — |
| After orientation |  | 450 | 400 | 350 | 400 | 350 | 450 | 490 | — | — | 100 | — |
| After boiling |  | 950 | 900 | 800 | 900 | 800 | 780 | 700 | — | — | — | — |
| PS | 23° C. | 1800 | 2000 | 2500 | 2300 | 2500 | 2200 | 2800 | — | — | — | — |
| PC | 23° C. | 2100 | 2300 | 2800 | 2800 | 3000 | 2400 | 3100 | — | — | — | — |
| PAN | 23° C. | 2000 | 2300 | 3000 | 2900 | 3200 | 2700 | 2500 | — | — | — | — |
| PP | 23° C. | 1) | 1) | 1) | 1) | 1) | 1) | 1) | — | — | — | — |
| HDPE | 23° C. | 1) | 1) | 1) | 1) | 1) | 1) | 1) | — | — | — | — |
| Extrudability |  | ○ | ○ | ○ | ○ | ○ | ○ | ○ | ○ | X 2) | ○ | ○ |

Note:
Ex. and CE. mean Example and Comparative Example, respectively. "—" in Comparative Examples 1–3 shows that the adhesive strength was extremely low or the evaluation could not be carried out since pelletizing was difficult. 1)means "peeling was impossible". 2)means "too sticky to be pelletized".

TABLE 2

Results of evaluated adhesive strength of films obtained by method B

| Adhesive resin composition used for the adhesive layer | Ex. 8 Ex. 4 | Ex. 9 Ex. 5 | Ex. 10 Ex. 6 |
|---|---|---|---|
| PET 23° C. | 3000 | 2900 | 2500 |
| 60° C. | 400 | 500 | 900 |
| After orientation | 350 | 300 | 330 |
| After boiling | 700 | 750 | 400 |
| PA 23° C. | 1) | 3000 | 2800 |
| 60° C. | — | 400 | 800 |
| After orientation | 1) | 400 | 450 |
| After boiling | 1) | 900 | 1) |
| EVOH 23° C. | 1) | 2300 | 1900 |
| 60° C. | — | 450 | 950 |
| After orientation | 1) | 300 | 500 |
| After boiling | 1) | 500 | 1) |
| PO 23° C. | 1) | 1) | 1) |
| 60° C. | 1) | 1) | 1) |
| After orientation | 1) | 1) | 1) |
| After boiling | 1) | 1) | 1) |

Note:
Ex. and "—" mean "Example" and "not evaluated", respectively. 1)means "peeling was impossible".

Laminates in the following Examples 11–16, and Comparative Examples 5–8 were produced in the following method A or method B.

1) Method A: Two-kind-three-layer Coextrusion Water-cooled Inflation Film Forming Method The layer structure from the inner layer to the outer layer was an adherend/an adhesive/an adherend. Each layer had a thickness of 100 μm.

The die width of the extruder, from the inner layer to the outer layer, was 45 mmφ/35 mmφ/45 mmφ.

The extrusion conditions for each adherend are shown as follows.
Coextrusion Temperature
  Polyester type resins=270° C.
  Polyamide type resins=240° C.
  Ethylene-vinyl acetate copolymer saponified products= 225° C.
  Acrylic resins=200° C.
  Styrene type resins=200° C.
  Polycarbonate resins=265° C.
  Polyolefin type resins=200° C.
  The line speed was set at 5 m/min.

2) Method B: Three-kind-five-layer Coextrusion Sheet Forming Method

The layer structure from the inner layer to the outer layer was an adherend/an adhesive/a gas barrier resin/an adhesive/an adherend, and the thickness of each layer was 220 μm/40 μm/50 μm/40 μm/220 μm.

The die width of the extruder was 65 mmφ/45 mmφ/45 mmφ/45 mmφ/65 mmφ.

The coextrusion conditions for each adherent are shown as follows.
Coextrusion Temperature
  Polyester type resins=225° C.
  Polyamide type resins=220° C.
  Ethylene-vinyl acetate copolymer saponified products= 235° C.
  Acrylic resins=210° C.
  Styrene type resins=200° C.
  Polycarbonate resins=265° C.
  Polyolefin type resins=210° C.
  The line speed was set at 5 m/min.

In the following Examples 11–16 and Comparative Examples 5–8, laminates were oriented by the following method.
Tenter Method
  Standard type biaxial orientation machine: produced by T.M. Long Co., Ltd.
  Maximum orientation magnification: 7.2×7.2 times
  Orientation speed: 7.6–3000 cm/min
  Heating method: hot air circulation (room temperature— 350° C.)

Orientation head driving: oil cylinder

Thickness of a stretchable sample: 0.08–2 mm

Orientation magnification: 3.5×3.5 times

The evaluation items were examined according to the following methods.

The adhesive strength of the laminate (kg/10 mm) in the following Examples 11–16 and Comparative Examples 5–8 was measured according to JIS K-6854 under the following conditions.

Peeling width: 10 mm

Peeling conditions: T-peel

Peeling speed: 50 mm/min

Temperature: 23° C. and 60° C.

Boiling treatment in the following Examples 11–16 and Comparative Examples 5–8 was carried out as follows.

The laminates of the present invention produced by method A or method B were drawn by 3.5×3.5 times and the resulting films were subjected to the following treatment.

The oriented film was put in a PE bag and heat sealed then treated in a hot water of 90° C. for 30 minutes, then taken out from the hot water and cooled in water of 23° C. (for about 30 minutes) to give a sample.

Example 11

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 5% by weight, a tackifier (an alicyclic petroleum resin, number average molecular weight: 710, specific gravity: 0.998, softening point: 115° C.) in an amount of 10% by weight, and ethylene-butadiene copolymer (density: 0.860, melting point: 23° C., MFR-190° C. 2.16 kg: 1 g/10 minutes) in an amount of 85% by weight were previously mixed in a 50 L twin-shell blender for 5 minutes, melted and kneaded with a twin screw extruder PCM 30 (D=30 mm$\phi$, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 12

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 5% by weight, a tackifier (an alicyclic petroleum resin, number average molecular weight: 860, specific gravity: 0.999, softening point: 140° C.) in an amount of 60% by weight, styrene-butadiene copolymer hydrogenated product (styrene ratio: 20% by weight, MFR-200° C. 5 kg: 0.3 g/10 minutes, hydrogenation ratio: 97%) in an amount of 5% by weight and ethylene-butene copolymer (density: 0.880, melting point: 72° C., MFR-190° C. 2.16 kg: 1 g/10 minutes) in an amount of 30% by weight were previously mixed in a 50 L twin-shell blender for 5 minutes, melted and kneaded with a twin screw extruder PCM 30 (D=30 mm$\phi$, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 13

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 10% by weight, a tackifier (an alicyclic petroleum resin, number average molecular weight: 860, specific gravity: 0.999, softening point: 140° C.) in an amount of 20% by weight, styrene-butadiene copolymer hydrogenated product (styrene ratio: 40% by weight, MFR-200° C. 5 kg: 0.7 g/10 minutes, hydrogenation ratio: 98%) in an amount of 5% by weight and a low-density polyethylene density: 0.900 g/cm$^3$, melting point: 88° C., MFR-190° C. 2.16 kg: 5 g/10 minutes) in an amount of 65% by weight were mixed previously in a 50 L twin-shell blender for 5 minutes, melted and kneaded with a twin screw extruder PCM 30 (D=30 mm$\phi$, L/D=32; Ikegai Corporation) at a temperature of 180° C., a screw revolving speed of 180 rpm, a feed rate of 11 kg/hour and extruded into the form of a strand, which was cooled and then cut to produce pellets.

Example 14

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 20% by weight, a tackifier ($\beta$-pinene-terpene type resin, number average molecular weight: 820, softening point: 112° C.) in an amount of 40% by weight, styrene-propylene copolymer hydrogenated product (styrene ratio: 30% by weight, MFR-200° C. 5 kg: 4 g/10 minutes, hydrogenation ratio: 98%) in an amount of 5% by weight and a straight-chain low density polyethylene (density: 0.919 g/cm$^3$, melting point: 124° C., MFR-190° C. 2.16 kg: 2 g/10 minutes) in an amount of 35% by weight were mixed previously in a 50 L twin-shell blender for 5 minutes, melted and kneaded with a twin screw extruder PCM 30 (D=30 mm$\phi$, L/D=32; Ikegai Corporation) at a temperature of 180° C., a screw revolving speed of 180 rpm, a feed rate of 11 kg/hour and extruded into the form of a strand, which was cooled and then cut to produce pellets.

Comparative Example 5

Maleic anhydride graft modified styrene-butadiene copolymer hydrogenated product (grafted ratio: 2% by weight, MFR-200° C. 5 kg: 22 g/10 minutes, styrene ratio: 30% by weight, hydrogenation ratio: 98%) in an amount of 20% by weight, styrene-butadiene copolymer hydrogenated product (styrene ratio: 20% by weight, MFR-200° C. 5 kg: 0.3 g/10 minutes, hydrogenation ratio: 98%) in an amount of 30% by weight, and ethylene-butene copolymer (density: 0.900 g/cm$^3$, melting point: 88° C., MFR-190° C. 2.16 kg: 0.8 g/10 minutes) in an amount of 50% by weight were previously mixed in a 50 L twin-shell blender for 5 minutes, melted and kneaded with a twin screw extruder PCM 30 (D=30 mm$\phi$, L/D=32; Ikegai Corporation) at a temperature of 180° C., a screw revolving speed of 180 rpm, a feed rate of 11 kg/hour and extruded into the form of a strand, which was cooled and then cut to produce pellets.

Comparative Example 6

Styrene-butadiene copolymer hydrogenated product (styrene ratio: 29% by weight, MFR-200° C. 5 kg: 10 g/10 minutes, hydrogenation ratio: 98%) in an amount of 20% by weight, a tackifier (an alicyclic petroleum resin, number average molecular weight: 860, specific gravity: 0.999, softening point: 140° C.) in an amount of 30% by weight, and a low-density polyethylene (density: 0.919 g/cm$^3$, melting point: 109° C., MFR-190° C. 2.16 kg: 14 g/10 minutes) in an amount of 50% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was cooled and then cut to produce pellets.

Comparative Example 7

A tackifier (an alicyclic petroleum resin, number average molecular weight: 710, specific gravity: 0.998, softening point: 115° C.) in an amount of 20% by weight, and ethylene-butene copolymer (density: 0.920 g/cm$^3$, melting point: 124° C., MFR-190° C. 2.16 kg: 2 g/10 minutes) in an amount of 80% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 180 rpm, a feed rate of 11 kg/hour and extruded into the form of a strand, which was coDled and then cut to produce pellets.

The pellets obtained in the above-mentioned Examples 11–14, and Comparative Examples 5–8 were used with various adherends, i.e. polyester type resin, Dianite PA 500D (specific gravity: 1.34 g/cm$^3$, intrinsic viscosity: 0.76 dl/g, available from Mitsubishi Rayon Co., Ltd.), ethylene-vinyl acetate copolymer saponified product, Eval EP-F101 (density: 1.19 g/cm$^3$, melt index: 1.3, ethylene copolymer content: 32 mol %, available from Kuraray Co., Ltd.), polyamide type resin, Novatech 1020 CA2 (melting point: 224° C., available from Mitsubishi Chemical Co., Ltd.), styrene type resin, Denkastyrol HI-E-4 (specific gravity: 1.04, melt index: 3.5, available from Denki Kagaku Kogyo K.K.), polyolefin type resin, Novatech HD HY340 (density: 0.953 g/cm$^3$, melt flow rate: 1.5 g/10 minutes, available from Nippon Polychem Co., Ltd), Novatech PP FY6H (density: 0.90 g/cm$^3$, melt flow rate: 1.9 g/10 minutes, available from Nippon Polychem Co., Ltd.), acrylic resin, Valex 2090 (specific gravity: 1.15, melt index: 3 g/10 minutes, from Mitsui Toatsu Chemicals, Inc.), polycarbonate, Eupiron E-2000 (specific gravity: 1.2, from Mitsubishi Gas Chemical Co., Inc.), and two-kind-three-layer films were produced with the adhesion process of method A, cooled and hardened and the adhesive strength of the raw film was measured in an atmosphere of 23° C. and high temperature adhesive strength thereof was measured in an atmosphere of 60° C. The adhesive strength of an oriented film was measured after the film had been oriented in an atmosphere of 70° C. in the machine direction and cross direction by 3.5×3.5 times on a tenter, and the adhesive strength of the film which was then subjected to boil treatment (90° C., 30 minutes) was measured in an atmosphere of 23° C. The results are shown in Table 3. In Table 3, figures in the rows for styrene type resins, polycarbonate, acrylic resins, polypropylene, and polyethylene indicated by 23° C. are the data of the raw films.

Examples 15–16 and Comparative Example 8

The pellets obtained in the above-mentioned Examples 12–13, and Comparative Example 5, were used with polyolefin type resin, LE 425 (density: 0.923 g/cm$^3$, MFR: 2, available from Mitsubishi Chemical Co., Ltd.) as an adherend, and gas barrier resins such as polyester type resin, PET-G 6763 (specific gravity: 1.27 g/cm$^3$, intrinsic viscosity: 0.75 dl/g, available from Eastman Kodak Co.), polyamide type resin, Novatech 1020 CA2 (melting point: 224° C., available from Mitsubishi Chemical Co., Ltd.), ethylene-vinyl acetate copolymer saponified product, Eval EP-E151B (density: 1.14 g/cc, melt index: 5.5, ethylene copolymer content: 44 mol %, available from Kuraray Co., Ltd.), three-kind-five-layer films were produced with the adhesion process of method B, cooled and hardened and the adhesive strength of the raw film was measured in an atmosphere of 23° C. and high temperature adhesive strength thereof was measured in an atmosphere of 60° C. The adhesive strength of an oriented film was measured after the film had been oriented in an atmosphere of 70° C. in the machine direction and cross direction by 3.5×3.5 times on a tenter, and the adhesive strength of the film which was then subjected to boiling treatment (90° C., 30 minutes) was measured in an atmosphere of 23° C. The results are shown in Table 4.

TABLE 3

Results of evaluated adhesive strength of films obtained by method A

|  |  | Ex. 11 | Ex. 12 | Ex. 13 | Ex. 14 | CE. 5 | CE. 6 | CE. 7 |
|---|---|---|---|---|---|---|---|---|
| PES | 23° C. | 1800 | 2200 | 2500 | 1900 | 10 | 2200 | 150 |
|  | 60° C. | 100 | 120 | 210 | 250 | — | 100 | — |
| After orientation |  | 150 | 170 | 200 | 150 | — | 100 | — |
| After boiling |  | 180 | 150 | 180 | 200 | — | 110 | — |
| EVOH | 23° C. | 1800 | 1600 | 2400 | 2800 | 1800 | 1500 | 80 |
|  | 60° C. | 120 | 100 | 180 | 100 | 100 | 50 | — |
| After orientation |  | 160 | 190 | 280 | 350 | 5 | 70 | — |
| After boiling |  | 350 | 400 | 500 | 700 | — | 50 | — |
| PA | 23° C. | 1) | 1) | 1) | 1) | 2500 | 1800 | 100 |
|  | 60° C. | 120 | 150 | 180 | 150 | 80 | 30 | — |
| After orientation |  | 220 | 380 | 400 | 400 | 10 | 100 | — |
| After boiling |  | 450 | 530 | 680 | 860 | — | 70 | — |
| PS | 23° C. | 1100 | 1900 | 2300 | 1900 | 10 | — | — |
| PC | 23° C. | 1000 | 2000 | 2100 | 1850 | 5 | — | — |
| PAN | 23° C. | 1300 | 2300 | 2400 | 2100 | 5 | — | — |
| PP | 23° C. | 1) | 1) | 1) | 1) | — | — | — |
| HDPE | 23° C. | 1) | 1) | 1) | 1) | 1) | — | — |
| Extrudability |  | ◯ | ◯ | ◯ | ◯ | ◯ | ◯ | ◯ |

Note:
Ex. and CE. mean Example and Comparative Example, respectively. "—" means "not evaluated". 1)means "peeling was impossible".

TABLE 4

Results of evaluated adhesive strength
of films obtained by method B

| Adhesive resin composition used for the adhesive layer | Ex. 15 Ex. 12 | Ex. 16 Ex. 13 | CE. 8 CE. 5 |
|---|---|---|---|
| PES 23° C. | 1800 | 2100 | 100 |
| 60° C. | 120 | 210 | — |
| After orientation | 200 | 300 | — |
| After boiling | 200 | 350 | — |
| PA 23° C. | 1) | 1) | 1800 |
| 60° C. | — | — | 60 |
| After orientation | 1) | 1) | 100 |
| After boiling | 1) | 1) | 150 |
| EVOH 23° C. | 2500 | 2200 | 1000 |
| 60° C. | 100 | 200 | 80 |
| After orientation | 250 | 350 | 50 |
| After boiling | 550 | 600 | 80 |
| PO 23° C. | 1) | 1) | 1) |
| 60° C. | 1) | 1) | 1) |
| After orientation | 1) | 1) | 1) |
| After boiling | 1) | 1) | 1) |

Note:
Ex. and "—" mean "Example" and "not evaluated", respectively. [1])means "peeling was impossible". One side of the adhesive layer of the three-kind-five-layer laminates comprises a layer of a PES, PA or EVOH, and the other side comprises a layer of PO.

Example 17

Maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 10% by weight, a tackifier (an aromatic hydrogenated type petroleum resin, number-average molecular weight: 860, specific gravity: 0.999, softening point: 140° C.) in an amount of 15% by weight, ethylene-butene copolymer (density: 0.88 g/cm$^3$, MFR (190° C., 2.16 kg): 1 g/10 minutes, melting point: 72° C.) in an amount of 60% by weight and hydrogenated styrene-butadiene block copolymer (styrene content: 30%, MFR: 10 g/10 minutes) in an amount of 15% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer (layer A).

This composition was used for the adhesive layer (layer A). For the thermoplastic resin layer (layer B), a low-density polyethylene (LM38 available from Mitsubishi Chemical Co., Ltd.) or a polypropylene (FL 25R available from Mitsubishi Chemical Co., Ltd.) was used, and, for a gas barrier resin, polyester type resin (PET-G 6763, having a specific gravity of 1.27, an intrinsic viscosity of 0.75 dl/g, available from Eastman Kodak Co.), an ethylene-vinyl acetate copolymer saponified product (Eval EP-G156, having an ethylene content of 47 mol %, a density of 1.12, a melting point of 160° C., a melt index of 6.4, available from Kuraray Co.), a polyamide type resin (Novatech 1020 CA2, having a melting point of 224° C., available from Mitsubishi Chemical Co., Ltd.), a polycarbonate (Eupiron E2000, having a specific gravity of 1.2, available from Mitsubishi Gas Chemical Co., Ltd.), a polystyrene type resin (Denkastyrol HI-E-4, having a specific gravity of 1.04, a melt index of 3.5, available from Denki Kagaku Kogyo K.K.), an acrylic resin: polyacrylonitrile (Palex 3000N, having a specific gravity of 1.15, a melt index of 3, available from Mitsui Toatsu Kagaku K.K.) were used.

The resin film, sheet or metal foil used in this example for the laminate was selected from the following biaxially oriented films or aluminium foil:

O-PET (oriented polyethylene terephthalate) #12 (thickness of 12 μm)

O-Ny (oriented nylon) #15 (thickness of 15 μm)

O-PP (oriented polypropylene) #20 (thickness of 20 μm)

O-EVOH (oriented ethylene-vinyl acetate copolymer saponified product) #12 (thickness of 12 μm) (backed with PP for reinforcement/thickness of 40 μam)

Al foil #7 (thickness of 7 μm) (backed with by PET for reinforcement/thickness of 30 μm) SiO$_2$ deposited O-PET (oriented polyethylene terephthalate wherein silica is deposited on the adhesive surface) #12 (thickness of 12 μm)

K-Ny (oriented nylon wherein the adhesive surface is K-coated) #15 (thickness of 15 μm)

Printed film (O-PP film having solid printing on it) #20 (thickness of 20 μm)

A laminate was produced by two-kind-two-layer coextrusion T-die film forming method, in which an adhesive layer (45 mmφ) and a resin layer (90 mmφ) were laminated in this order on a resin film, sheet or metal foil, in a thickness of 3 μm and 37 μm respectively at the coextrusion temperatures shown below.

Polyester type resins=275° C.

Polyamide type resins=250° C.

Ethylene-vinyl acetate copolymer saponified products= 230° C.

Acrylic resins=220° C.

Styrene type resins=220° C.

Polycarbonate resins=275° C.

Polyolefin type resins=230° C.

The line speed was set at 70 m/min.

Interlayer adhesive force between the thermoplastic resin layer (layer B) and the resin film, sheet, or metal foil was evaluated according to JIS K-6854 under the following conditions.

Peeling width: 10 mm

Peeling condition: T-peel

Peeling speed: 50 mm/min

Measurement ambient temperature: 23° C.

Boiling evaluation, which is required with some applications, was carried out by the following process.

Boiling Treatment (1)

A laminate obtained by the above-mentioned production method (wherein Al foil was used) was heat sealed to provide a bag, which was filled with 100 cc of the following contents and subjected to treatment in 100° C. steam for 30 minutes, then cooled at 23° C. (for 3 hours) to obtain a sample.

Contents: A mixture of water, vinegar and an edible oil, mixed at 1:1:1.

Boiling Treatment (2)

A laminate obtained by the above-mentioned production method (resinous multilayer film) was heat sealed to provide a bag, which was filled with 100 cc of water as contents and subjected to treatment in a temperature controlled bath of 80° C. for 30 minutes, then cooled at 23° C. (for 3 hours) to obtain a sample.

The same procedure as that used in Example 17 was repeated for Examples 18–19 and Comparative Examples 9–13. Only the production method of the composition used for the adhesive layer (layer A) will be described and the evaluation results obtained with the resin film, sheet or metal (base material) are shown in Table 5 (wherein the thermoplastic resin layer (layer B) comprises a polyolefin type resin) and in Table 6 (wherein the thermoplastic resin layer (layer B) is other than polyolefin resins).

Example 18

Maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 20% by weight, a tackifier (an aromatic hydrogenated type petroleum resin, number average molecular weight: 750, specific gravity: 0.999, softening point: 125° C.) in an amount of 25% by weight, a low-density polyethylene (density: 0.922 g/cm$^3$, MFR (200° C., 5 kg): 10 g/10 minutes, melting point: 110° C.) in an amount of 25% by weight, and hydrogenated styrene-butadiene block copolymer (styrene content: 30% by weight, MFR: 10 g/10 minutes, hydrogenation ratio: 97%) in an amount of 30% by weight were previously mixed in a 50 L twin-shell blender for 5 minutes, melted and kneaded with a twin screw extruder PCM 30 (D=30 mmφ, L/D=32; Ikegai Corporation) at a temperature of 180° C., a screw revolving speed of 110 rpm, a feed rate of 5 kg/hour and extruded into the form of a strand, which was cooled then cut to produce a composition used for an adhesive layer.

Example 19

Maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 40% by weight, a tackifier (an aromatic hydrogenated type petroleum resin, number average molecular weight: 860, specific gravity: 0.999, softening point: 140° C.) in an amount of 25% by weight, and ethylene-butene copolymer (density: 0.92 g/cm$^3$, MFR: 2 g/10 minutes, melting point: 121° C.) in an amount of 35% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer.

Example 20

Maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 5% by weight, a tackifier (an aromatic hydrogenated type petroleum resin, number average molecular weight: 750, specific gravity: 0.999, softening point: 125° C.) in an amount of 35% by weight, a straight-chain polyethylene (density: 0.92 g/cm$^3$, MFR (200° C., 5 kg): 2 g/10 minutes, melting point: 121° C.) in an amount of 30% by weight and hydrogenated styrene-butadiene block copolymer (styrene content: 13% by weight, MFR: 8 g/10 minutes, hydrogenation ratio: 98%) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer.

Example 21

Maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 20% by weight, a tackifier (an aromatic hydrogenated type petroleum resin, number average molecular weight: 750, specific gravity: 0.999, softening point: 125° C.) in an amount of 30% by weight, a straight-chain polyethylene (density: 0.92 g/cm$^3$, MFR (190° C., 2.16 kg) 2 g/10 minutes, melting point: 121° C.) in an amount of 35% by weight and hydrogenated styrene-propylene block copolymer (styrene content: 30% by weight, MFR (200° C., 5 kg): 4 g/10 minutes, hydrogenation ratio: 99%) in an amount of 15% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer.

Example 22

Maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 10% by weight, a tackifier (β-pinene-terpene type resin, number average molecular weight: 820, softening point: 112° C.) in an amount of 20% by weight, a low-density polyethylene (density: 0.922 g/cm$^3$, MFR (190° C., 2.16 kg) 10 g/10 minutes, melting point: 110° C.) in an amount of 45% by weight and hydrogenated styrene-butadiene block copolymer (styrene content: 29% by weight, MFR (200° C., 5 kg): 10 g/10 minutes, hydrogenation ratio: 98%) in an amount of 25% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer.

Comparative Example 9

A low-density polyethylene (density: 0.922 g/cm$^3$, MFR (190° C., 2.16 kg): 10 g/10 minutes, melting point: 110° C.) in an amount of 70% by weight, and maleic anhydride modified hydrogenated styrene-butadiene block copolymer (maleic anhydride content: 2% by weight, styrene content: 20% by weight, density: 0.91 g/cm$^3$, MFR (200° C., 5 kg): 22 g/10 minutes, hydrogenation ratio: 98%) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer.

Comparative Example 10

A low-density polyethylene (density: 0.922 g/cm$^3$, MFR (190° C., 2.16 kg): 10 g/10 minutes, melting point: 110° C.)

in an amount of 70% by weight, and maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition.

Then the resin composition obtained as above in an amount of 50% by weight and EVA (V208M) in an amount of 50% by weight were mixed in a 50 L twin-shell blender for 5 minutes, and the resulting sample was evaluated in the same manner as that used in Example 1.

Comparative Example 11

A low-density polyethylene (density: 0.922 g/cm$^3$, MFR (190° C., 2.16 kg): 10 g/10 minutes, melting point: 110° C.) in an amount of 70% by weight, and maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition.

Then the composition obtained as above in an amount of 50% by weight and EMA (Nisseki RB 4200) in an amount of 50% by weight were mixed in a 50 L twin-shell blender for 5 minutes, and the resulting sample was evaluated in the same manner as that used in Example 1.

Comparative Example 12

Ethylene-butene copolymer (density: 0.890 g/cm$^3$, MFR (190° C., 2.16 kg): 4 g/10 minutes, melting point: 87° C.) in an amount of 70% by weight and a tackifier (an aromatic hydrogenated type petroleum resin, number-average molecular weight: 750, specific gravity: 0.999, softening point: 125° C.) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition.

TABLE 5

Results of evaluated adhesive strength
Adhesive strength with the base material (g/10 mm)

| Base material | Layer (B)* | Boil treatment | Ex. 17 | Ex. 18 | Ex. 19 | Ex. 20 | Ex. 21 | Ex. 22 | CE. 9 | CE. 10 | CE. 11 | CE. 12 |
|---|---|---|---|---|---|---|---|---|---|---|---|---|
| O-PET | PE | (i) | 300 | 320 | 330 | 350 | 300 | 310 | 0 | 10 | 10 | 90 |
|  |  | (ii) | 290 | 320 | 300 | 310 | 300 | 300 | — | — | — | — |
| O-Ny | PE | (i) | 310 | 300 | 310 | 280 | 340 | 280 | 0 | 10 | 10 | 100 |
|  |  | (ii) | 280 | 300 | 350 | 300 | 300 | 250 | — | — | — | — |
| O-PP | PE | (i) | 280 | 290 | 300 | 300 | 300 | 330 | 0 | 10 | 10 | 50 |
|  |  | (ii) | 300 | 280 | 290 | 310 | 280 | 300 | — | — | — | — |
| O-EVOH | PE | (i) | — | — | 200 | 230 | 350 | — | 0 | 10 | 10 | — |
|  |  | (ii) | — | — | 250 | 230 | 340 | — | — | — | — | — |
| SiOx deposited O-PET | PE | (i) | 200 | — | — | 250 | 300 | — | — | — | — | 50 |
|  |  | (ii) | 200 | — | — | 220 | 230 | — | — | — | — | — |
| K-Ny | PE | (i) | 310 | — | — | 300 | 290 | 300 | 0 | — | — | 10 |
|  |  | (ii) | 270 | — | — | 280 | 250 | 290 | — | — | — | — |
| Printed film | PE | (i) | — | 150 | — | — | — | — | — | — | — | 0 |
|  |  | (ii) | — | — | — | — | — | — | — | — | — | — |
| Al | PP | (i) | — | 200 | 230 | — | 250 | — | 0 | — | — | — |
|  |  | (ii) | — | 210 | 250 | — | 250 | — | — | — | — | — |

Note:
*peeling from the resin layer (layer B) was impossible.
Ex. and CE. mean Example and Comparative Example, respectively. "—" shows evaluation was not carried out.
(i) and (ii) in boil treatment mean before and after the boil treatment (1), respectively.

TABLE 6

Results of evaluated adhesive strength
Adhesive strength with resin layer (layer B)
comprising resins other than polyolefin resins (g/10 mm)
Not subjected to boiling treatment

| Base material | Layer (B) | Ex. 17 | Ex. 18 | Ex. 19 | CE. 9 | CE. 12 |
|---|---|---|---|---|---|---|
| O-PET | PES | 690 | 820 | 930 | 10 | 240 |
|  | EVOH | 1000 | 1100 | 1) | 990 | 160 |
|  | PA | 1) | 1) | 1) | 1) | 200 |
|  | PC | 720 | 950 | 1180 | 5 | 220 |
|  | PS | 500 | 750 | 820 | 5 | 200 |
|  | PAN | 550 | 730 | 790 | 10 | 210 |
| O-Ny | PES | 650 | 790 | 900 | 10 | 200 |
|  | EVOH | 900 | 1000 | 1) | 890 | 120 |
|  | PA | 1) | 1) | 1) | 1) | 230 |
|  | PC | 700 | 900 | 1000 | 5 | 200 |
|  | PS | 420 | 690 | 780 | 5 | 180 |
|  | PAN | 530 | 700 | 720 | 10 | 180 |
| SiOx deposited O-PET | PES | 600 | 810 | 820 | 10 | 200 |
|  | PA | 1) | 1) | 1) | 1) | 240 |
| K-Ny | PES | 630 | 780 | 850 | 15 | 200 |
|  | PA | 1) | 1) | 1) | 1) | 240 |
| Printed | PES | 600 | 800 | 910 | 10 | 220 |

TABLE 6-continued

Results of evaluated adhesive strength
Adhesive strength with resin layer (layer B)
comprising resins other than polyolefin resins (g/10 mm)
Not subjected to boiling treatment

| Base material | Layer (B) | Ex. 17 | Ex. 18 | Ex. 19 | CE. 9 | CE. 12 |
|---|---|---|---|---|---|---|
| film | PA | 1) | 1) | 1) | 1) | 260 |
| O-PP | PES | 720 | 840 | 950 | 10 | 280 |
|  | EVOH | 1100 | 1300 | 1) | 990 | 180 |
|  | PA | 1) | 1) | 1) | 1) | 250 |
|  | PC | 780 | 1000 | 1300 | 5 | 230 |
|  | PS | 560 | 780 | 800 | 5 | 200 |
|  | PAN | 550 | 650 | 690 | 10 | 250 |
| O-EVOH | PES | 700 | 780 | 980 | 10 | 220 |
|  | EVOH | 820 | 850 | 1) | 890 | 180 |
|  | PA | 1) | 1) | 1) | 1) | 210 |
|  | PC | 730 | 900 | 1050 | 5 | 200 |
|  | PS | 440 | 700 | 760 | 5 | 180 |
|  | PAN | 530 | 650 | 700 | 10 | 180 |

Note:
Ex. and CE. mean Example and Comparative Example, respectively.
1)means "peeling was impossible".

Example 23

As component (a), maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 5% by weight and hydrogenated styrene-butadiene block copolymer (styrene content: 30% by weight, MFR (200° C., 5 kg): 10 g/10 minutes, hydrogenation ratio: 97%) in an amount of 10% by weight were used, as component (b), a tackifier, an aromatic hydrogenated type petroleum resin (number average molecular weight: 860, specific gravity: 0.999, softening point: 112° C.) in an amount of 30% by weight was used, and as component (c), a low-density polyethylene (density: 0.919 g/cm$^3$, MFR (190° C., 2.16 kg): 14 g/10 minutes, melting point: 109° C.) in an amount of 55% by weight were used and they were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce a composition used for an adhesive layer.

This composition was used for the adhesive layer (layer A).

For the thermoplastic resin layer (layer B), polyolefin type resins such as a low-density polyethylene (LM38 available from Mitsubishi Chemical Co., Ltd.) or a polypropylene (FL25R available from Mitsubishi Chemical Co., Ltd.), polyester type resins such as PET-G 6763 (specific gravity: 1.27, intrinsic viscosity: 0.75 dl/g, available from Eastman Kodak Co.), ethylene-vinyl acetate copolymer saponified products such as Eval EP-G156 (ethylene content: 47 mol %, density: 1.12, melting point: 160° C., melt index: 6.4, available from Kuraray Co.), polyamide type resins such as Novatec 1020 CA2 (melting point: 224° C., available from Mitsubishi Chemical Co., Ltd.), polycarbonate type resins such as Eupiron E2000 (specific gravity: 1.2, available from Mitsubishi Gas Chemical Co., Ltd.), polystyrene type resins such as Denkastyrol HI-E-4 (specific gravity: 1.04, melt index: 3.5, available from Denki Kagaku Kogyo K.K.), acrylic resins such as polyacrylonitrile (Palex 3000N having a specific gravity of 1.15, a melt index of 3, available from Mitsui Toatsu Kagaku K.K.) were respectively used.

The base material used in this example which comprised a resin film, sheet or metal foil was a biaxially oriented film or aluminium foil shown as follows.

O-PET (oriented polyethylene terephthalate) #12 (thickness of 12 μm)

O-Ny (oriented nylon) #15 (thickness of 15 μm)

O-PP (oriented polypropylene) #20 (thickness of 20 μm)

O-EVOH (oriented ethylene-vinyl acetate copolymer saponified product) #12 (thickness of 12 μm)(backed with 40 μm thick PP for reinforcement)

Al foil (aluminium) #7 (thickness of 7 μm) (backed with 30 μm thick PET for reinforcement)

SiO$_2$ deposited O-PET (oriented polyethylene terephtalate wherein silica is deposited on the adhesive surface) #12 (thickness of 12 μm)

K-Ny (oriented nylon wherein the adhesive surface is K-coated (vinylidene chloride coating)) #15 (thickness of 15 μm)

Printed film (O-PP film the whole surface of which is printed) #20 (thickness of 20 μm)

A laminate was produced by two-kind-two-layer coextrusion T-die film forming method, in which an adhesive layer (layer A) was laminated on the base material, and a thermoplastic resin layer (layer B) was laminated thereon, and the diameter of the extruder was 45 mmφ for the layer A, and 90 mmφ for the layer B, the thickness of layer A was set to 5 μm, the thickness of layer B was set to 35 μm. The coextrusion lamination was carried out at a line speed of 80 m/min and at a different coextrusion temperature for each material as shown below.

Polyolefin type resins=230° C.

Polyester type resins=275° C.

EVOH type resins=230° C.

Polyamide type resins=250° C.

Polycarbonate type resins=275° C.

Polystyrene type resins=220° C.

Acrylic resins=220° C.

For the coextrusion lamination, the base material was not subjected either pre-heating or after-heating.

(Test method)

Interlayer adhesive force (g/10 mm) between the laminate comprising the adhesive layer (layer A) and the thermoplastic resin layer (layer B) and the base material was evaluated according to JIS K-6854 under the following conditions.

Peeling width: 10 mm

Peeling condition: T-peel

Peeling speed: 50 mm/min

Measurement ambient temperature: 23° C.

Boiling evaluation in steam or hot water required with some applications was carried out by the following methods.

Boiling Treatment (1)

A laminate obtained by the above-mentioned production method (wherein Al foil was used) was heat sealed to provide a bag, which was filled with 100 cc of the following contents then the opening was sealed, and subjected to treatment in 100° C. steam for 30 minutes, then cooled at 23° C. (for 3 hours) to obtain a measurement sample.

Contents 1 A mixture of water, vinegar and an edible oil, mixed at 1:1:1.

Boiling Treatment (2)

A laminate obtained by the above-mentioned production method (resinous multilayer film) was heat sealed to provide a bag, which was filled with 100 cc of water as contents, then sealed and subjected to treatment in a temperature controlled bath of 80° C. for 30 minutes, then cooled at 23° C. (for 3 hours) to give a measurement sample.

The same procedure as that used in Example 23 was repeated for Examples 24–26 and Comparative Examples 13–16. In the following description, only the production method of the composition used for the adhesive layer (layer A) will be given.

Among these compositions, the interlayer adhesive strength between the laminate layer and the base material obtained when polyolefin type resins were used for the thermoplastic resin layer (layer B) and laminated on the base material with an adhesive layer (layer A) is shown in Table 7 together with the results of Comparative Examples.

The interlayer adhesive strength between the laminate layer and the base material obtained when resins except for the polyolefin type resins were used for the thermoplastic resin layer (layer B) and laminated on the base material with an adhesive layer (layer A) is shown in Table 8 together with the results of Comparative Examples.

Example 24

As component (a), maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) was used in an amount of 20% by weight, as component (b), a tackifier, an aromatic hydrogenated type petroleum resin (number average molecular weight: 750, specific gravity: 0.999, softening point: 125° C.) was used in an amount of 30% by weight, and as component (c), a straight chain polyethylene (density: 0.920 g/cm$^3$, MFR (190° C., 2.16 kg): 2 g/10 minutes, melting point: 124° C.) was used in an amount of 50% by weight, and they were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce pellets of a composition used for an adhesive layer.

This composition was used for the adhesive layer (layer A) and the evaluation was carried out in the same manner as used in Example 23.

Example 25

As component (a), maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 30% by weight, and hydrogenated styrene-butadiene block copolymer (styrene content: 20% by weight, MFR: 0.3 g/10 minutes, hydrogenation ratio: 97%) in an amount of 5% by weight were used, as component (b), a tackifier, an aromatic hydrogenated type petroleum resin (number average molecular weight: 710, specific gravity: 0.998, softening point: 115° C.) was used in an amount of 10% by weight, as component (c), ethylene-butene copolymer (density: 0.88 g/cm$^3$, MFR (190° C., 2.16 kg): 1 g/10 minutes, melting point: 72° C.) was used in an amount of 82% by weight, and they were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce pellets of a composition used for an adhesive layer.

This composition was used for the adhesive layer (layer A) and the evaluation was carried out in the same manner as used in Example 23.

Example 26

As component (a), maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 20% by weight and hydrogenated styrene-propylene copolymer (styrene content: 30% by weight, MFR: 4 g/10 minutes, hydrogenation ratio: 99%) in an amount of 10% by weight were used, as component (b), a tackifier, β-pinene-terpene type resin (number average molecular weight: 820, softening point: 112° C.) was used in an amount of 35% by weight, as component (c), a low-density polyethylene (density: 0.92 g/cm$^3$, MFR (190° C., 2.16 kg): 1 g/10 minutes, melting point: 121° C.) was used in an amount of 35% by weight, and they were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce pellets of a composition used for an adhesive layer.

This composition was used for the adhesive layer (layer A) and the evaluation was carried out in the same manner as used in Example 23.

Comparative Example 13

A low-density polyethylene (density: 0.919 g/cm$^3$, MFR (190° C., 2.16 kg): 14 g/10 minutes, melting point: 109° C.) in an amount of 70% by weight, and maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce pellets of a composition used for an adhesive layer.

This composition was used instead of the adhesive layer of the present invention (layer A) and the evaluation was carried out in the same manner as used in Example 23.

Comparative Example 14

A low-density polyethylene (density: 0.919 g/cm$^3$, MFR (190° C., 2.16 kg): 14 g/10 minutes, melting point: 109° C.) in an amount of 70% by weight, and maleic anhydride modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 30% by weight were previously mixed in a 50 L twin-shell blender for 5 minutes, melted and kneaded with a twin screw extruder PCM 30 (30 mmφ, L/D=32; Ikegai Corporation) at a temperature of 180° C., a screw revolving speed of 110 rpm, a feed rate of 5 kg/hour and extruded into the form of a strand, which was cooled and then cut to produce pellets of a composition used for an adhesive layer.

Then the resin composition obtained as above in an amount of 50% by weight and EVA (V208M) in an amount of 50% by weight were mixed in a 50 L twin-shell blender for 5 minutes, and the resulting sample was used instead of the adhesive layer of the present invention (layer A) and the evaluation was carried out in the same manner as that used in Example 23.

Comparative Example 15

A low-density polyethylene (density: 0.919 g/cm$^3$, MFR (190° C., 2.16 kg): 14 g/10 minutes, melting point: 109° C.) in an amount of 70% by weight, and maleic anhydride an amount of 70% by weight, and a tackifier (an aromatic hydrogenated Lype petroleum resin, number average molecular weight: 750, specific gravity: 0.999, softening point: 125° C.) in an amount of 30% by weight were previously mixed in a 50 L twin-shell blender for 5 minutes, melted and kneaded with a twin screw extruder PCM 30 (30 mm$\phi$, L/D=32; Ikegai Corporation) at a temperature of 180° C., a screw revolving speed of 110 rpm, a feed rate of 5 kg/hour and extruded into the form of a strand, which was cooled and then cut to produce pellets of a composition. This composition was used instead of the adhesive layer of the present invention (layer A) and the evaluation was carried out in the same manner as used in Example 23.

TABLE 7

Results of evaluated adhesive strength
Adhesive strength with the base material (g/10 mm)

| Base material | Layer (B)* | Boil treatment | Ex. 23 | Ex. 24 | Ex. 25 | Ex. 26 | CE. 13 | CE. 14 | CE. 15 | CE. 16 |
|---|---|---|---|---|---|---|---|---|---|---|
| O-PET | PE | (i) | 380 | 320 | 250 | 300 | 0 | 5 | 5 | 180 |
|  |  | (ii) | 250 | 300 | — | — | — | — | — | 0 |
| O-Ny | PE | (i) | 250 | 300 | 180 | 250 | 0 | 5 | 5 | 210 |
|  |  | (ii) | 180 | 280 | — | — | — | — | — | 0 |
| O-PP | PE | (i) | 250 | 280 | 230 | 310 | 0 | 5 | 5 | 50 |
|  |  | (ii) | 200 | 280 | — | — | — | — | — | 0 |
| O-EVOH | PE | (i) | — | 280 | 150 | 250 | 0 | 5 | 5 | 10 |
|  |  | (ii) | — | 290 | — | — | — | — | — | — |
| SiOx de-posited O-PET | PE | (i) | 280 | — | 200 | — | — | — | — | — |
|  |  | (ii) | 270 | — | — | — | — | — | — | — |
| K-Ny | PE | (i) | — | 310 | 200 | — | 0 | — | — | — |
|  |  | (ii) | — | 300 | — | — | — | — | — | — |
| Printed film | PE | (i) | — | 120 | — | — | — | 0 | 0 | — |
|  |  | (ii) | — | — | — | — | — | — | — | — |
| Al | PP | (i) | 300 | 350 | — | — | 0 | — | — | — |
|  |  | (ii) | 320 | 380 | — | — | — | — | — | — |

Note:
*peeling from the resin layer (layer B) was impossible.
Ex. and CE. mean Example and Comparative Example, respectively. "—" shows evaluation was not carried out.
(i) and (ii) in boil treatment mean before and after the boil treatment (1), respectively.

modified hydrogenated styrene-butadiene block copolymer (maleic anhydride content: 2% by weight, styrene content: 30% by weight, density: 0.91 g/cm$^3$, MFR (200° C., 5 kg): 22 g/10 minutes, hydrogenation ratio: 98%) in an amount of 30% by weight were previously mixed in a 50 L twin-shell blender for 5 minutes, melted and kneaded with a twin screw extruder PCM 30 (30 mm$\phi$, L/D=32; Ikegai Corporation) at a temperature of 180° C., a screw revolving speed of 110 rpm, a feed rate of 5 kg/hour and extruded into the form of a strand, which was cooled and then cut to produce pellets of a composition.

Then the resin composition obtained as above in an amount of 50% by weight and EVA (Nisseki RB4200) in an amount of 50% by weight were mixed in a 50 L twin-shell blender for 5 minutes, and the resulting sample was used instead of the adhesive layer of the present invention (layer A) and the evaluation was carried out in the same manner as that used in Example 23.

Comparative Example 16

Ethylene-butene copolymer (density: 0.88 g/cm$^3$, MFR (190° C., 2.16 kg): 4 g/10 minutes, melting point: 72° C.) in

TABLE 8

Results of evaluated adhesive strength
Adhesive strength with resin layer (layer B)
comprising resins other than polyolefin resins (g/10 mm)
Not subjected to boiling treatment

| Base material | Layer (B) | Ex. 23 | Ex. 24 | CE. 14 | CE. 15 |
|---|---|---|---|---|---|
| O-PET | PES | 750 | 720 | 30 | 50 |
|  | EVOH | 650 | 850 | 80 | 100 |
|  | PA | 1) | 1) | 120 | 150 |
|  | PC | 800 | 680 | 30 | 30 |
|  | PS | 550 | 640 | 20 | 30 |
|  | PAN | 530 | 550 | 30 | 20 |
| O-Ny | PES | 790 | 720 | 30 | 50 |
|  | EVOH | 600 | 800 | 80 | 80 |
|  | PA | 1) | 1) | 100 | 120 |
|  | PC | 800 | 720 | 30 | 30 |
|  | PS | 560 | 600 | 30 | 20 |
|  | PAN | 500 | 580 | 20 | 30 |
| SiOx de-posited O-PET | PES | 710 | 680 | 40 | 50 |
|  | PA | 1) | 1) | 80 | 100 |
| K-Ny | PES | 700 | 650 | 50 | 60 |
|  | PA | 1) | 1) | 100 | 120 |
| Printed | PES | 680 | 600 | 30 | 50 |

TABLE 8-continued

Results of evaluated adhesive strength
Adhesive strength with resin layer (layer B)
comprising resins other than polyolefin resins (g/10 mm)
Not subjected to boiling treatment

| Base material | Layer (B) | Ex. 23 | Ex. 24 | CE. 14 | CE. 15 |
|---|---|---|---|---|---|
| film | PA | 1) | 1) | 100 | 130 |
| O-PP | PES | 800 | 750 | 30 | 40 |
|  | EVOH | 580 | 810 | 70 | 100 |
|  | PA | 1) | 1) | 120 | 150 |
|  | PC | 720 | 720 | 10 | 10 |
|  | PS | 580 | 600 | 20 | 20 |
|  | PAN | 550 | 580 | 30 | 20 |
| O-EVOH | PES | 770 | 720 | 30 | 50 |
|  | EVOH | 650 | 820 | 50 | 70 |
|  | PA | 1) | 1) | 150 | 100 |
|  | PC | 800 | 750 | 10 | 10 |
|  | PS | 550 | 550 | 20 | 20 |
|  | PAN | 550 | 480 | 20 | 30 |

Note:
Ex. and CE. mean Example and Comparative Example, respectively.
1)means "peeling was impossible".

While the invention has been described in detail and with reference to specific embodiments thereof, it will be apparent to one of ordinary skill in the art that various changes and modifications can be made therein without departing from the spirit and scope thereof.

What is claimed is:

1. An adhesive resin composition consisting essentially of 50–99% by weight of a modified hydrogenated block copolymer (a), which is obtained by hydrogenating a block copolymer consisting essentially of a vinyl aromatic compound and a conjugated diene compound followed by modification by graft polymerization with an unsaturated carboxylic acid or anhydride thereof, wherein the content of the unsaturated carboxylic acid or anhydride thereof is 0.01–20% by weight, and 1–50% by weight of a tackifier (b).

2. An adhesive resin composition consisting essentially of 50–99% by weight of a modified hydrogenated block copolymer (a), which is obtained by hydrogenating a block copolymer consisting essentially of a vinyl aromatic compound and a conjugated diene compound followed by modification by graft polymerization with an unsaturated carboxylic acid or anhydride thereof, wherein the content of the unsaturated carboxylic acid or anhydride thereof is 0.01–20% by weight, 1–50% by weight of a tackifier (b), and an ethylenic polymer (c) having a melt flow rate of 0.05–50 g/10 minutes and a density of 0.850–0.950 g/cm$^3$ in an amount of 10–1000 parts by weight per 100 parts by weight of the total of the modified hydrogenated block copolymer (a) and the tackifier (b), said ethylenic polymer (c) being an ethylene homopolymer or an ethylene-α-($C_{3-20}$)alkene copolymer.

3. An adhesive resin composition consisting essentially of a modified hydrogenated block copolymer (a) in an amount of not less than 1% by weight and less than 50% by weight, which is obtained by hydrogenating a block copolymer consisting essentially of a vinyl aromatic compound and a conjugated diene compound followed by modification by graft polymerization with an unsaturated carboxylic acid or anhydride thereof, wherein the content of the unsaturated carboxylic acid or the anhydride thereof is 0.01–20% by weight, a tackifier (b) in an amount of more than 50% by weight and not more than 99% by weight, and an ethylenic polymer (c) having a melt flow rate of 0.05–50 g/10 minutes and a density of 0.850–0.950 g/cm$^3$ in an amount of 10–1000 parts by weight per 100 parts by weight of the total of the modified hydrogenated block copolymer (a) and the tackifier (b), said ethylenic polymer (c) being an ethylene homopolymer or an ethylene-α-($C_{3-20}$)alkene copolymer.

4. An adhesive resin composition according to claims 1 wherein not less than 50% of the olefinic double bond in a polymer block of the hydrogenated block copolymer which comprises the conjugated diene compound is hydrogenated.

5. A laminate comprising a thermoplastic resin layer (layer B) comprising a thermoplastic resin which is selected from the group consisting of ethylene-vinyl acetate copolymer saponified products having an ethylene content of 15–65 mol %, and a saponification degree of not less than 90%, polyamide resins, polyolefin resins, styrene resins, polyester resins, acrylic resins and polycarbonate resins, and an adhesive resin layer (layer A) comprising an adhesive resin composition according to claim 1.

6. An oriented film obtained by stretching a laminate according to claim 5, in at least one axial direction by 1.5 times or more in terms of area ratio.

7. An oriented film obtained by stretching a laminate according to claim 5, in two axial directions by 1.5 times or more in terms of area ratio.

8. A method of producing a laminate comprising coextrusion laminating an adhesive layer (layer A) consisting essentially of 50–99% by weight of a modified hydrogenated block copolymer (a), which is obtained by hydrogenating a block copolymer consisting essentially of a vinyl aromatic compound and a conjugated diene compound followed by modification by graft polymerization with an unsaturated carboxylic acid or anhydride thereof, wherein the content of the unsaturated carboxylic acid or anhydride thereof is 0.01–20% by weight, and 1–50% by weight of a tackifier (b), and a thermoplastic resin layer (layer B) comprising a thermoplastic resin which is selected from the group consisting of ethylene-vinyl acetate copolymer saponified products having an ethylene content of 15–65 mol %, and a saponification degree of not less than 90%, polyamide resins, polyolefin resins, styrene resins, polyester resins, acrylic resins and polycarbonate resins, said layer B being adhered to on a resin film, sheet or metal by said adhesive layer A.

9. A production method according to claim 8 wherein the adhesive layer (layer A) comprises a blend containing an ethylenic polymer (c) having a melt flow rate of 0.05–50 g/10 minutes, and a density of 0.850–0.950 g/cm$^3$ in an amount of 10–1000 parts by weight per 100 parts by weight of the total of the modified hydrogenated block copolymer (a) and the tackifier (b), said ethylenic polymer (c) being an ethylene homopolymer or an ethylene-α-($C_{3-20}$)alkene copolymer.

10. A method of producing a laminate comprising extrusion laminating an adhesive layer (layer A) consisting essentially of a modified hydrogenated block copolymer (a) in an amount of not less than 1% by weight and less than 50% by weight, which is obtained by hydrogenating a block copolymer consisting essentially of a vinyl aromatic compound and a conjugated diene compound followed by modification by graft polymerization with an unsaturated carboxylic acid or anhydride thereof, wherein the content of the unsaturated carboxylic acid or anhydride thereof is 0.01–20% by weight, a tackifier (b) in an amount of more than 50% by weight and not more than 99% by weight, and an ethylenic polymer (c) having a melt flow rate of 0.05–50 g/10 minutes and a density of 0.850–0.950 g/cm$^3$ in an amount of 10–1000 parts by weight per 100 parts by weight of the total of the modified hydrogenated block copolymer (a) and the tackifier (b), said ethylenic polymer (c) being an ethylene homopolymer or an ethylene-α-($C_{3-20}$)alkene copolymer, and a thermoplastic resin layer (layer B) comprising a thermoplastic resin which is selected from the group consisting of ethylene-vinyl acetate copolymer saponified products having an ethylene content of 15–65 mol %, and a saponification degree of not less than 90%, polyamide resins, polyolefin resins, styrene resins, polyester resins,—acrylic resins—and polycarbonate resins, said layer B being adhered to on a resin film, sheet or metal by said adhesive layer A.

11. A laminate obtained by the production method according to any one of claims 8–10.

12. The adhesive resin composition according to claim 2, wherein said ethylenic polymer (c) is a low density polyethylene or an ethylene-butene copolymer.

13. The adhesive resin composition according to claim 3, wherein said ethylenic polymer (c) is a low density polyethylene or an ethylene-butene copolymer.

14. The method according to claim 10, wherein said ethylenic polymer (c) is a low density polyethylene or an ethylene-butene copolymer.

* * * * *